United States Patent
Hamaguchi et al.

(10) Patent No.: US 8,440,780 B2
(45) Date of Patent: May 14, 2013

(54) WHOLLY AROMATIC LIQUID CRYSTALLINE POLYESTER AND METHOD OF PRODUCING THE SAME

(75) Inventors: Mitsushige Hamaguchi, Nagoya (JP); Kohei Miyamoto, Nagoya (JP); Hideyuki Umetsu, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 13/617,677

(22) Filed: Sep. 14, 2012

(65) Prior Publication Data

US 2013/0012680 A1    Jan. 10, 2013

Related U.S. Application Data

(63) Continuation of application No. PCT/JP2011/006971, filed on Dec. 14, 2011.

(30) Foreign Application Priority Data

Dec. 27, 2010  (JP) .................................. 2010-289705
Jun. 24, 2011  (JP) .................................. 2011-140053

(51) Int. Cl.
*C08G 64/00* (2006.01)
*C08G 63/02* (2006.01)

(52) U.S. Cl.
USPC ........... 528/191; 528/190; 528/192; 528/193; 528/271; 528/272

(58) Field of Classification Search .................. 528/190, 528/191, 192, 193, 271, 272
See application file for complete search history.

(56) References Cited

U.S. PATENT DOCUMENTS

| | | | |
|---|---|---|---|
| 5,066,767 A | 11/1991 | Matzner et al. | |
| 5,079,289 A | 1/1992 | Layton et al. | |
| 5,089,594 A | 2/1992 | Stern et al. | |
| 5,097,001 A | 3/1992 | Layton et al. | |
| 5,147,967 A | 9/1992 | Stern et al. | |
| 5,204,417 A | 4/1993 | Stern et al. | |
| 5,216,091 A | 6/1993 | Stern et al. | |
| 5,216,092 A | 6/1993 | Huspeni et al. | |
| 5,296,542 A | 3/1994 | Layton et al. | |
| 5,306,806 A | 4/1994 | Tanabe et al. | |
| 5,492,946 A | 2/1996 | Huspeni et al. | |
| 6,046,300 A | 4/2000 | Umetsu et al. | |
| 7,914,699 B2 | 3/2011 | Tachikawa et al. | |
| 2007/0243376 A1 | 10/2007 | Tachikawa et al. | |
| 2010/0053972 A1 | 3/2010 | Nakayama | |
| 2011/0204407 A1 | 8/2011 | Cupta et al. | |
| 2011/0213077 A1 | 9/2011 | Bertucci et al. | |
| 2011/0318982 A1 | 12/2011 | Funatsu et al. | |

FOREIGN PATENT DOCUMENTS

| | | |
|---|---|---|
| JP | 01-98618 | 4/1989 |
| JP | 05-271394 | 10/1993 |
| JP | 07-330875 | 12/1995 |
| JP | 8-41187 A | 2/1996 |
| JP | 10-007780 | 1/1998 |
| JP | 10-095839 | 4/1998 |
| JP | 2966457 | 8/1999 |
| JP | 11-263829 | 9/1999 |
| JP | 2003-313403 | 11/2003 |
| JP | 2005-320478 | 11/2005 |
| JP | 2006-89714 | 4/2006 |
| JP | 2006-342458 A | 12/2006 |
| JP | 2007-169379 | 7/2007 |
| JP | 2010-174114 | 8/2010 |
| JP | 2010-202785 | 9/2010 |
| JP | 2012-506939 | 3/2012 |
| TW | 200844177 A | 3/1997 |
| TW | 201038783 A1 | 11/2010 |

*Primary Examiner* — Terressa Boykin
(74) *Attorney, Agent, or Firm* — DLA Piper LLP (US)

(57) ABSTRACT

A wholly aromatic liquid crystalline polyester contains 2.0 to 15.0 mole percent of a hydroquinone-derived structural unit relative to a total amount of structural units. The wholly aromatic liquid crystalline polyester has sum of an amount (a) of terminal hydroxyl group and an amount (b) of terminal acetyl group in a range of 50 to 350 equivalents/(g·$10^{-6}$), and has a ratio [(a)+(b)]/(c) of the sum of the amount (a) of terminal hydroxyl group and the amount (b) of terminal acetyl group to an amount (c) of terminal carboxyl group in a range of 1.05 to 2.00.

11 Claims, 1 Drawing Sheet

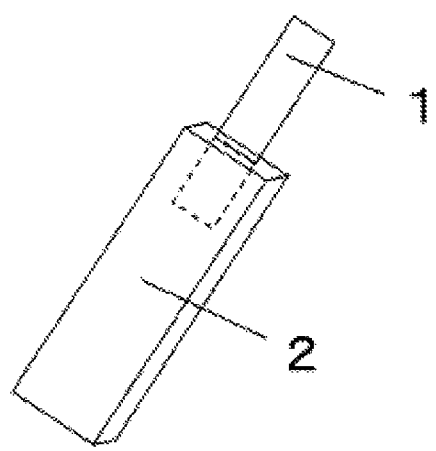

WHOLLY AROMATIC LIQUID CRYSTALLINE POLYESTER AND METHOD OF PRODUCING THE SAME

RELATED APPLICATIONS

This application is a continuation of International Application No. PCT/JP2011/006971 with an international filing date of Dec. 14, 2011, which is based on Japanese Patent Application No. 2010-289705 filed Dec. 27, 2010 and Japanese Patent Application No. 2011-140053 filed Jun. 24, 2011, the subject matter of which is incorporated by reference.

TECHNICAL FIELD

This disclosure relates to a wholly aromatic liquid crystalline polyester having excellent fog resistance, metal adhesion property and creep resistance, a method of producing the same, a resin composition and a molded product manufactured from the same.

BACKGROUND

In recent years, liquid crystalline polyesters have been used especially in the fields of electricity and electronics, due to their heat resistance, flow properties and electric properties, and their demand has expanded. The use of liquid crystalline polyester for the liquid crystal display support base material or the lamp structural component for OA equipment and cell phones has recently been studied by taking advantage of their thermal stability and high thermal dimension accuracy as the support base material of heat-generating components. In these fields, there are many components produced by insert molding a metal terminal into the liquid crystalline polyester, so that there is a requirement for high metal adhesion property of the liquid crystalline polyester. In those applications, the liquid crystalline polyester is often in contact with the heat-generating metal part, e.g., terminal. This may often cause a trouble, such as haze by the gas evolved from the polymer. Liquid crystalline resins with less evolution of acetic acid vapor, phenol vapor and carbon dioxide in the heating process have been proposed (e.g., see JP 2006-89714A) to eliminate such trouble. The proposed liquid crystalline resins have, however, still insufficient practical properties, such as fog resistance and need further improvement for metal adhesion property.

Controlling the terminal group structures of liquid crystalline polyesters has been studied (e.g., see JP H01-98618A, JP H05-271394A and JP H11-263829A) to exert the advantageous effects such as thermal curing by the reactive groups in the post process, hydrolysis resistance and molding stability. The liquid crystalline polyesters produced by taking into account such studies have, however, still insufficient properties including metal adhesion property, fog resistance and creep resistance and do not satisfy the properties recently required in the fields of electricity and electronics.

It could therefore be helpful to provide a wholly aromatic liquid crystalline polyester having excellent fog resistance, metal adhesion property and creep resistance, and a resin composition and a molded product manufactured from the same.

SUMMARY

We discovered that wholly aromatic liquid crystalline polyester with specific terminal groups specifically have excellent fog resistance, metal adhesion property and creep resistance. We also found that injection molding the wholly aromatic liquid crystalline polyester specifically reduces mold deposit.

(1) We thus provide a wholly aromatic liquid crystalline polyester containing 2.0 to 15.0 mole percent of a hydroquinone-derived structural unit relative to a total amount of structural units. The wholly aromatic liquid crystalline polyester has sum of an amount (a) of terminal hydroxyl group and an amount (b) of terminal acetyl group in a range of 50 to 350 equivalents/(g·$10^{-6}$), and has a ratio [(a)+(b)]/(c) of the sum of the amount (a) of terminal hydroxyl group and the amount (b) of terminal acetyl group to an amount (c) of terminal carboxyl group in a range of 1.05 to 2.00.

The content of the hydroquinone-derived structural unit is preferably higher than 2.0 mole percent relative to the total amount of structural units. The content of the hydroquinone-derived structural unit is also preferably lower than 15.0 mole percent relative to the total amount of structural units.

The sum of the amount (a) of terminal hydroxyl group and the amount (b) of terminal acetyl group is preferably greater than 50 equivalents/(g·$10^{-6}$). The sum of the amount (a) of terminal hydroxyl group and the amount (b) of terminal acetyl group is also preferably less than 350 equivalents/(g·$10^{-6}$).

The ratio [(a)+(b)]/(c) is preferably higher than 1.05. The ratio [(a)+(b)]/(c) is also preferably lower than 2.00.

(2) The wholly aromatic liquid crystalline polyester described in (1) has a ratio (a)/[(a)+(b)] of the amount (a) of terminal hydroxyl group to the sum of the amount (a) of terminal hydroxyl group and the amount (b) of terminal acetyl group in a range of 0.30 to 1.00.

The ratio (a)/[(a)+(b)] is preferably higher than 0.30. The ratio (a)/[(a)+(b)] is also preferably lower than 1.00.

In the wholly aromatic liquid crystalline polyester described in (1), however, the ratio (a)/[(a)+(b)] may be lower than 0.30. In the wholly aromatic liquid crystalline polyester described in (1), the ratio (a)/[(a)+(b)] may be higher than 1.00.

(3) The wholly aromatic liquid crystalline polyester described in either (1) or (2) has an absolute number-average molecular weight of 5000 to 25000 measured by gel permeation chromatography/light scattering method.

The absolute number-average molecular weight is preferably greater than 5000. The absolute number-average molecular weight is also preferably less than 25000.

In the wholly aromatic liquid crystalline polyester described in either (1) or (2), however, the absolute number-average molecular weight may be less than 5000. In the wholly aromatic liquid crystalline polyester described in either (1) or (2), the absolute number-average molecular weight may be greater than 25000.

(4) The wholly aromatic liquid crystalline polyester described in any of (1) to (3) comprises structural units (I), (II), (III), (IV) and (V) shown below. In the wholly aromatic liquid crystalline polyester, content of the structural unit (I) is 65 to 80 mole percent relative to a total amount the structural units (I), (II) and (III), content of the structural unit (II) is 55 to 85 mole percent relative to a total amount of the structural units (II) and (III), content of the structural unit (IV) is 50 to 95 mole percent relative to a total amount of the structural units (IV) and (V), and the total amount of the structural units (II) and (III) is substantially equimolar with the total amount of the structural units (IV) and (V).

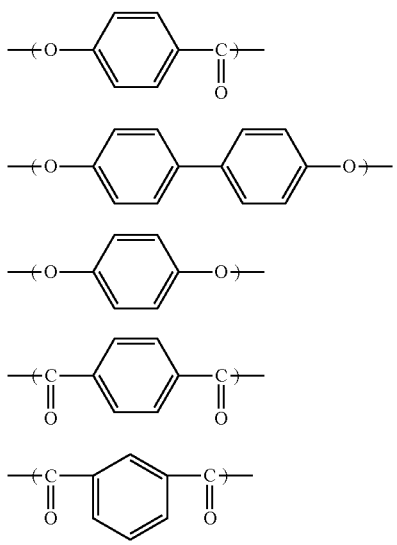

The content of the structural unit (I) is preferably higher than 65 mole percent relative to the total amount of the structural units (I), (II) and (III). The content of the structural unit (I) is also preferably lower than 80 mole percent relative to the total amount of the structural units (I), (II) and (III).

The content of the structural unit (II) is preferably higher than 55 mole percent relative to the total amount of the structural units (II) and (III). The content of the structural unit (II) is also preferably lower than 85 mole percent relative to the total amount of the structural units (II) and (III).

The content of the structural unit (IV) is preferably higher than 50 mole percent relative to the total amount of the structural units (IV) and (V). The content of the structural unit (IV) is also preferably lower than 95 mole percent relative to the total amount of the structural units (IV) and (V).

In the wholly aromatic liquid crystalline polyester described in any of (1) to (3), however, the content of the structural unit (I) may be lower than 65 mole percent relative to the total amount of the structural units (I), (II) and (III). The content of the structural unit (I) may be higher than 80 mole percent relative to the total amount of the structural units (I), (II) and (III).

In the wholly aromatic liquid crystalline polyester described in any of (1) to (3), however, the content of the structural unit (II) may be lower than 55 mole percent relative to the total amount of the structural units (II) and (III). The content of the structural unit (II) may be higher than 85 mole percent relative to the total amount of the structural units (II) and (III).

In the wholly aromatic liquid crystalline polyester described in any of (1) to (3), however, the content of the structural unit (IV) may be lower than 50 mole percent relative to the total amount of the structural units (IV) and (V). The content of the structural unit (IV) may be higher than 95 mole percent relative to the total amount of the structural units (IV) and (V).

The term "substantially equimolar" means that the structural units forming the polymer main chain except the terminal groups are equimolar.

The wholly aromatic liquid crystalline polyester described in any of (1) to (3) may be configured without at least part of the structural units (I), (II), (III), (IV) and (V).

(5) A method produces the wholly aromatic liquid crystalline polyester described in any of (1) to (4). The method acetylates hydroxyl group of a material monomer of the wholly aromatic liquid crystalline polyester with acetic anhydride and subsequently heats polymerization reaction solution to or above melting temperature of the wholly aromatic liquid crystalline polyester with removal of acetic acid to enable deacetylation polymerization, so as to produce the wholly aromatic liquid crystalline polyester. In the method of preparing the wholly aromatic liquid crystalline polyester, a removal rate obtained by Equation [1] given below is 50 to 80% when temperature of the polymerization reaction solution reaches 250° C.

removal rate(%)=amount of distillate (g)/[(number of moles of loaded acetic anhydride (mol)−number of moles of hydroxyl group (mol) in the material monomer)×molecular weight of acetic anhydride (g/mol)+(number of moles of hydroxyl group (mol) in the material monomer×2×molecular weight of acetic acid (g/mol))]×100   [1]

The removal rate is preferably higher than 50%. The removal rate is also preferably lower than 80%.

In the method of producing the wholly aromatic liquid crystalline polyester described in any of (1) to (4), however, the removal rate may be lower than 50%. In the method of producing the wholly aromatic liquid crystalline polyester described in any of (1) to (4), the removal rate may be higher than 80%.

(6) A wholly aromatic liquid crystalline polyester resin composition is produced by adding 10 to 200 parts by weight of filler relative to 100 parts by weight of the wholly aromatic liquid crystalline polyester described in any of (1) to (4).

The content of the filler is preferably greater than 10 parts by weight relative to 100 parts by weight of the wholly aromatic liquid crystalline polyester. The content of the filler is also preferably less than 200 parts by weight relative to 100 parts by weight of the wholly aromatic liquid crystalline polyester.

In the polymer composition containing the wholly aromatic liquid crystalline resin described in any of (1) to (4), however, the content of the filler may be less than 10 parts by weight relative to 100 parts by weight of the wholly aromatic liquid crystalline polyester. In the polymer composition containing the wholly aromatic liquid crystalline resin described in any of (1) to (4), the content of the filler may be greater than 200 parts by weight relative to 100 parts by weight of the wholly aromatic liquid crystalline polyester.

(7) A molded product is manufactured by melt molding the wholly aromatic liquid crystalline polyester described in any of (1) to (4) or the wholly aromatic liquid crystalline polyester resin composition described in (6).

The molded product may, however, be manufactured by a different method other than melt molding, from the wholly aromatic liquid crystalline polyester described in any of (1) to (4) or the wholly aromatic liquid crystalline polyester resin composition described in (6).

The wholly aromatic liquid crystalline polyester thus has excellent fog resistance, metal adhesion property and creep resistance. Injection molding the wholly aromatic liquid crystalline polyester or the wholly aromatic liquid crystalline polyester resin composition provides the molded product having less mold deposit and excellent fog resistance, metal adhesion property and creep resistance.

BRIEF DESCRIPTION OF THE DRAWINGS

FIG. 1 schematically illustrates a test piece for measurement of metal terminal pull-out strength produced by insert molding a metal terminal in Examples and Comparative Examples.

REFERENCE SIGNS LIST

1 Metal terminal
2. Resin

DETAILED DESCRIPTION

The wholly aromatic liquid crystalline polyester may be polyester called thermotropic liquid crystalline polymer having optical anisotropy in the molten state and contains 2.0 to 15.0 mole percent of a hydroquinone-derived structural unit relative to the total amount of structural units. The content of the hydroquinone-derived structural unit lower than 2.0 mole percent tends to decrease the fog resistance. From the standpoint of further improved fog resistance, the content of the hydroquinone-derived structural unit is preferably not lower than 4.0 mole percent. The content of the hydroquinone-derived structural unit higher than 15.0 mole percent, on the other hand, tends to decrease the metal adhesion property. From the standpoint of further improved metal adhesion property, the content of the hydroquinone-derived structural unit is not higher than 10.0 mole percent.

The wholly aromatic liquid crystalline polyester preferably has structural units (I), (II), (III), (IV) and (V) shown by the following formulae:

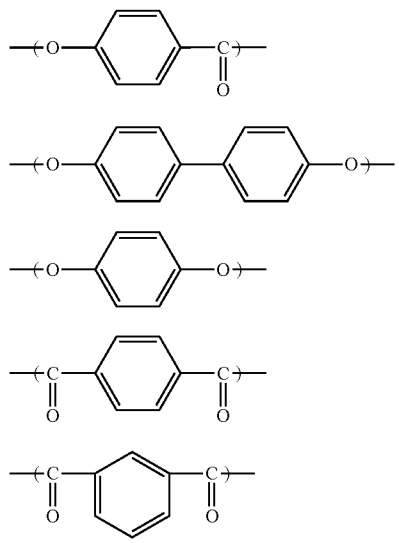

The structural unit (I) represents p-hydroxybenzoic acid-derived structural unit; the structural unit (II) represents 4,4'-dihydroxybiphenyl-derived structural unit; the structural unit (III) represents hydroquinone-derived structural unit; the structural unit (IV) represents terephthalic acid-derived structural unit; and the structural unit (V) represents isophthalic acid-derived structural unit.

The content of the structural unit (I) is preferably not lower than 65 mole percent and more preferably not lower than 68 mole percent and is preferably not higher than 80 mole percent and more preferably not higher than 78 mole percent, relative to the total amount of the structural units (I), (II) and (III).

The content of the structural unit (II) is preferably not lower than 55 mole percent and more preferably not lower than 58 mole percent and is preferably not higher than 85 mole percent, more preferably not higher than 78 mole percent and further more preferably not higher than 73 mole percent, relative to the total amount of the structural units (II) and (III).

The content of the structural unit (IV) is preferably not lower than 50 mole percent, more preferably not lower than 55 mole percent and further more preferably not lower than 60 mole percent and is preferably not higher than 95 mole percent, more preferably not higher than 90 mole percent and further more preferably not higher than 85 mole percent, relative to the total amount of the structural units (IV) and (V).

It is also preferable that the total amount of the structural units (II) and (III) is substantially equimolar with the total amount of the structural units (IV) and (V). The term "substantially equimolar" herein means that the structural units forming the polymer main chain except the terminal groups are equimolar. Even the non-equimolar composition when including the structural units of the terminal groups may accordingly satisfy the "substantially equimolar" condition.

Setting the contents of the above structural units (I) to (V) in the above ranges further improves the fog resistance and the metal adhesion property of the wholly aromatic liquid crystalline polyester. Such setting also improves the affinity to the filler in a filler-containing resin composition, thus enabling further improvement of the creep resistance. Such setting also reduces mold deposit in injection molding.

The contents of the respective structural units are calculable from an area ratio of peaks corresponding to the respective structural units by $^1$H-NMR spectroscopy, in which the wholly aromatic liquid crystalline polyester is weighed in an NMR sample tube and is dissolved in a wholly aromatic liquid crystalline polyester-soluble solvent (for example, pentafluorophenol/1,1,2,2-tetrachloroethane-$d_2$ mixture).

The terminal groups of the wholly aromatic liquid crystalline polyester may include terminal hydroxyl group, terminal acetyl group and terminal carboxyl group. The sum of the amount (a) of terminal hydroxyl group [unit: equivalent/(g·10$^{-6}$)] and the amount (b) of terminal acetyl group [unit: equivalent/(g·10$^{-6}$)] of them is 50 to 350 equivalents/(g·10$^{-6}$). However, the amount (b) of terminal acetyl group may be equal to zero. The sum (a)+(b) less than 50 equivalents/(g·10$^{-6}$) tends to lower the metal adhesion property and the creep resistance. From the standpoint of further improved metal adhesion property and creep resistance, the sum (a)+(b) is preferably not less than 75 equivalents/(g·10$^{-6}$). The sum (a)+(b) of greater than 350 equivalents/(g·10$^{-6}$), on the other hand, tends to lower the fog resistance. From the standpoint of further improved fog resistance, the sum (a)+(b) is preferably not greater than 200 equivalents/(g·10$^{-6}$).

The amounts of the respective terminal groups of the wholly aromatic liquid crystalline polyester are calculable from area ratios of peaks corresponding to the respective terminal groups to a peak corresponding to the polymer main chain backbone by $^{13}$C-NMR spectroscopy for terminal hydroxyl group and terminal carboxyl group and $^1$H-NMR spectroscopy for terminal acetyl group, in which the wholly aromatic liquid crystalline polyester is weighed in an NMR sample tube and is dissolved in a wholly aromatic liquid crystalline polyester-soluble solvent (for example, pentafluorophenol/1,1,2,2-tetrachloroethane-$d_2$ mixture).

In the wholly aromatic liquid crystalline polyester, the ratio [(a)+(b)]/(c) of the sum of the amount (a) of terminal hydroxyl group [unit: equivalent/(g·10$^{-6}$)] and the amount (b) of terminal acetyl group [unit: equivalent/(g·10$^{-6}$)] to the amount (c) of terminal carboxyl group [unit: equivalent/(g·10$^{-6}$)] may be 1.05 to 2.00. The conventionally known liquid crystalline polyester having the hydroquinone-derived structural unit has the ratio [(a)+(b)]/(c) of not higher than 1, due to the high sublimation property of hydroquinone monomer, and evolves carbon dioxide by degradation of the terminal carboxyl group. The wholly aromatic liquid crystalline polyester may be, on the other hand, configured to have the ratio [(a)+(b)]/(c) of not lower than 1.05 by terminal group control, so as to reduce evolution of carbon dioxide derived from the terminal carboxyl group and improve the fog resistance and the metal adhesion property. This ratio is preferably not lower than 1.10 and more preferably not lower than 1.30, which further improves the fog resistance and the metal adhesion property. This also reduces a change in melt viscosity of the wholly aromatic liquid crystalline polyester kept in the molten state. The wholly aromatic liquid crystalline polyester having a small change in melt viscosity in the molten state, i.e., having high thermal stability in the molten state is not likely to have a viscosity change during melt process and is thus suitable for precision molding. The ratio [(a)+(b)]/(c) of higher than 2.00, on the other hand, makes it difficult to increase the degree of polymerization of the wholly aromatic liquid crystalline polyester and thereby significantly decreases the metal adhesion property. From the standpoint of further improved metal adhesion property, the ratio [(a)+(b)]/(c) of not higher than 1.60 is more preferable.

In the wholly aromatic liquid crystalline polyester, the ratio (a)/[(a)+(b)] of the amount (a) of terminal hydroxyl group [unit: equivalent/(g·10$^{-6}$)] to the sum of the amount (a) of terminal hydroxyl group [unit: equivalent/(g·10$^{-6}$)] and the amount (b) of terminal acetyl group [unit: equivalent/(g·10$^{-6}$)] is preferably 0.30 to 1.00. Controlling the terminal hydroxyl group in the above range reduces gas evolution derived from the terminal acetyl group and further improves the fog resistance. From the standpoint of further improved fog resistance, the ratio (a)/[(a)+(b)] is more preferably not lower than 0.40, further more preferably not lower than 0.55 and most preferably not lower than 0.60.

From the standpoint of further improved metal adhesion property, the absolute number-average molecular weight of the wholly aromatic liquid crystalline polyester is preferably not less than 5000, more preferably not less than 7000 and further more preferably not less than 8000. From the standpoint of improved fog resistance by terminal group control of the wholly aromatic liquid crystalline polyester, on the other hand, the absolute number-average molecular weight is preferably not greater than 25000, more preferably not greater than 20,000 and further more preferably not greater than 18000.

The absolute number-average molecular weight is measurable by GPC/light scattering method (gel permeation chromatography/light scattering method) using a wholly aromatic liquid crystalline polyester-soluble solvent as the eluent. Available examples of the wholly aromatic liquid crystalline polyester-soluble solvent include halogenated phenols and mixtures of halogenated phenols and general organic solvents. Preferable examples are pentafluorophenol and pentafluorophenol/chloroform mixture. From the standpoint of handling, especially preferable of them is pentafluorophenol/chloroform mixture.

The melt viscosity of the wholly aromatic liquid crystalline polyester is preferably 1 to 200 Pa·s and more preferably 10 to 100 Pa·s and further more preferably 20 to 50 Pa·s. The melt viscosity is measured with a Koka-type flow tester (constant-load orifice-type flow tester) at a shear rate of 1000/second under the temperature condition of the melting point of the wholly aromatic liquid crystalline polyester+10° C.

The melting point herein means an endothermic peak temperature (Tm2) observed by differential scanning calorimetry, in which after observation of an endothermic peak temperature (Tm1) in measurement with heating the polymerized wholly aromatic liquid crystalline polyester at a rate of 20° C./minute from room temperature, the temperature is sequentially maintained at Tm1+20° C. for 5 minutes, decreased to room temperature at a rate of 20° C./minute, and increased again at a rate of 20° C./minute. The melting point of the wholly aromatic liquid crystalline polyester is preferably 220 to 350° C., more preferably 250 to 345° C. and further more preferably 270 to 340° C.

The method of producing the wholly aromatic liquid crystalline polyester is not restrictive, but may be any method equivalent to the known polyester polymerization method which produces the wholly aromatic liquid crystalline polyester having the specific terminal groups. The following are examples of the known polyester polymerization methods:

(1) method of producing the wholly aromatic liquid crystalline polyester by deacetylation polymerization reaction from p-acetoxybenzoic acid, 4,4'-diacetoxybiphenyl, diacetoxybenzene (diacetylated hydroquinone), terephthalic acid and isophthalic acid;

(2) method of producing the wholly aromatic liquid crystalline polyester by deacetylation polymerization reaction after acetylation of phenolic hydroxyl group by reaction of acetic anhydride with p-hydroxybenzoic acid, 4,4'-dihydroxybiphenyl, hydroquinone, terephthalic acid and isophthalic acid;

(3) method of producing the wholly aromatic liquid crystalline polyester by dephenolation polymerization reaction from phenyl p-hydroxybenzoate, 4,4'-dihydroxybiphenyl, hydroquinone, diphenyl terephthalate and diphenyl isophthalate; and (4) method of producing the wholly aromatic liquid crystalline polyester by dephenolation polymerization reaction with addition of aromatic dihydroxy compounds, such as 4,4'-dihydroxybiphenyl and hydroquinone after phenyl esterification by reaction of specified amounts of diphenyl carbonate with p-hydroxybenzoic acid and aromatic dicarboxylic acids, such as terephthalic acid and isophthalic acid.

From the standpoint of polymerization reaction control, preferably used is the method (2) of producing the wholly aromatic liquid crystalline polyester by deacetylation polymerization reaction after acetylation of phenolic hydroxyl group by reaction of acetic anhydride with p-hydroxybenzoic acid, 4,4'-dihydroxybiphenyl, hydro quinone, terephthalic acid and isophthalic acid.

A preferable method of stably producing the wholly aromatic liquid crystalline polyester having the terminal groups controlled to the above specified ranges controls the amount of a distillate distilled out of the polymerization system during the polymerization reaction to a specified range. An especially preferable method controls the amount of acetic acid distilled out of the polymerization system during the polymerization reaction to a specified range to perform deacetylation polymerization reaction. More specifically, this method acetylates hydroxyl group of the material monomers of the wholly aromatic liquid crystalline polyester with acetic anhydride and subsequently heats the polymerization reaction solution to or above the melting temperature of the wholly aromatic liquid crystalline polyester with removal of acetic acid to enable deacetylation polymerization, so as to produce the wholly aromatic liquid crystalline polyester. The removal rate obtained by Equation [1] given below is preferably 50 to 80% when the temperature of the polymerization reaction solution reaches 250° C.

Removal Rate(%)=amount of distillate (g)/[(number of moles of loaded acetic anhydride (mol)−number of moles of hydroxyl group (mol) in material monomers)×molecular weight of acetic anhydride (g/mol)+(number of moles of hydroxyl group (mol) in material monomers×2×molecular weight of acetic acid (g/mol))]×100    [1]

In the acetylation process, a preferable procedure mixes specified amounts of p-hydroxybenzoic acid, 4,4'-dihydroxybiphenyl, hydroquinone, terephthalic acid, isophthalic acid and acetic anhydride in a reaction vessel and heats the mixture with stirring in nitrogen gas atmosphere for acetylation of hydroxyl group. The reaction vessel may be equipped with stirring blades, may be equipped with a distillation pipe, and may be equipped with an outlet in its bottom portion. The conditions of acetylation are generally 1 to 3 hours in a temperature range of 130 to 150° C. To readily control the sum (a)+(b), the ratio [(a)+(b)]/(c) and the ratio (a)/[(a)+(b)] to the above ranges, the temperature of not lower than 143° C. is preferable from the standpoint of improved acetylation reaction rate. More preferable is not lower than 147° C.

To readily control the sum (a)+(b), the ratio [(a)+(b)]/(c) and the ratio (a)/[(a)+(b)] to the above ranges, the amount of acetic anhydride used is preferably 1.00 to 1.15 mole equivalents, more preferably 1.03 to 1.12 mole equivalents and further more preferably 1.05 to 1.10 mole equivalents relative to the total amount of phenolic hydroxyl group in p-hydroxybenzoic acid, 4,4'-dihydroxybiphenyl and hydroquinone. Setting the amount of acetic anhydride used relative to the total amount of hydroxyl group to or above 1.00 mole equivalent preferably progresses quantitative acetylation of hydroxyl group to accelerate the polymerization reaction. Setting the amount of acetic anhydride used relative to the total amount of hydroxyl group to or below 1.15 mole equivalents, on the other hand, preferably enables easier control of the terminal groups of the wholly aromatic liquid crystalline polyester to the above ranges.

The conventional method typically prepares the monomers to have the total number of moles of terephthalic acid and isophthalic acid equal to the total number of moles of 4,4'-dihydroxybiphenyl and hydroquinone. To readily control the sum of the amount of terminal hydroxyl group and the amount of terminal acetyl group in the resulting wholly aromatic liquid crystalline polyester to a desired range, an excess amount of highly sublimable hydroquinone may be added in a range of 2 to 15% to the equimolar amounts of the monomers.

To progress the reaction with removal of acetic acid after acetylation, a preferable procedure heats the polymerization reaction solution to or above the melting temperature of the wholly aromatic liquid crystalline polyester under reduced pressure to enable deacetylation polymerization. In the heating process, the polymerization reaction is preferably controlled to have the removal rate of 50 to 80% when the temperature of the polymerization reaction solution reaches 250° C. Controlling the removal rate to or above 50% preferably allows the polymerization reaction to proceed with the high reaction rate and produces the polymer of less variation in composition. Especially preferable is controlling the removal rate to or above 65%. Controlling the removal rate to or below 80%, on the other hand, preferably reduces the amount of hydroquinone distilled out with acetic acid from the polymerization system and thereby readily controls the terminal-groups of the wholly aromatic liquid crystalline polyester to the above ranges. More preferable is controlling the removal rate to or below 75 mole percent, and especially preferable is controlling the removal rate to or below 73 mole percent. The polymerization reaction with controlling the temperature of the acetylation process to the above range to improve the acetylation reaction rate, accompanied with controlling the removal rate to 65 to 73 mole percent when the temperature of the polymerization reaction solution reaches 250° C. readily produces the wholly aromatic liquid crystalline polyester having the ratio [(a)+(b)]/(c) of 1.30 to 2.00. The distillation state is stabled when the temperature of the polymerization reaction solution is not lower than 250° C. The removal rate at the temperature of 250° C. is accordingly used as a typical indication of the removal rate.

In the deacetylation polymerization process, the melt polymerization method is preferably employed to complete the polymerization reaction under reduced pressure at a temperature at which the wholly aromatic liquid crystallization polyester melts. The melt polymerization method is advantageous to produce the homogeneous polymer and preferably gives the excellent polymer with less gas evolution.

The polymerization temperature may be the general melting temperature of the wholly aromatic liquid crystalline polyester, for example, in a range of 250 to 365° C. and is preferably the temperature of melting point of the wholly aromatic liquid crystalline polyester+at least 10° C. The pressure reduction during polymerization is generally 0.1 mmHg (13.3 Pa) to 20 mmHg (2660 Pa), preferably not higher than 10 mmHg (1330 Pa) and more preferably not higher than 5 mmHg (665 Pa). The stirring rate during polymerization is preferably not higher than 50 rpm. The polymerization time between the pressure reduction to or below 665 Pa and the completion of polymerization with detection of a specified torque is preferably 0.5 to 1 hour. The acetylation and the polymerization may be performed successively in one identical reaction vessel or may be performed in different reaction vessels.

An available method of taking the resulting polymer out of the reaction vessel after completion of polymerization may increase the internal pressure of the reaction vessel at a temperature at which the polymer melts to discharge the polymer from an outlet provided in the reaction vessel and subsequently cool down the discharged polymer in cooling solution. The internal pressure of the reaction vessel may be increased to, for example, 0.02 to 0.5 MPa. The outlet may be provided in the bottom portion of the reaction vessel. The polymer may be discharged in the form of strands from the outlet. The polymer cooled down in cooling solution may be cut into polymer pellets.

In the process of producing the wholly aromatic liquid crystalline polyester, the solid phase polymerization method may be employed to complete the polymerization reaction. An available method may crush the polymer or the oligomer of wholly aromatic liquid crystalline polyester with a mill and heat the crushed polymer or oligomer in nitrogen flow or under reduced pressure to progress the polymerization to a desired degree and complete the reaction. The heating conditions may be 1 to 50 hours in a temperature range of the melting point of the wholly aromatic liquid crystalline polyester −5° C. to the melting point −50° C. (for example, 200 to 300° C.).

The polymerization reaction of the wholly aromatic liquid crystalline polyester may proceed without a catalyst, but a metal compound, such as tin (II) acetate, tetrabutyl titanate, potassium acetate, sodium acetate, antimony trioxide, and metal magnesium may be used as the catalyst.

A resin composition may be produced by adding a specific amount of filler that does not damage the advantageous effects to the wholly aromatic liquid crystalline polymer. The filler may be, for example, fibrous filler, plate-like filler, powdery filler or granular filler. More specifically, available examples of the filler include: glass fiber; PAN-derived or pitch-derived carbon fibers; metal fibers such as stainless steel fiber, aluminum fiber and brass fiber; organic fibers such as aromatic polyamide fiber and liquid crystalline polyester fiber; fibrous or whisker fillers such as plaster fiber, ceramic fiber, asbestos fiber, zirconia fiber, alumina fiber, silica fiber, titanium oxide fiber, silicon carbide fiber, rock wool, potassium titanate whisker, barium titanate whisker, aluminum borate whisker, silicon nitride whisker and needle-like titanium oxide; and powdery, granular or plate-like fibers such as mica, talc, kaolin, silica, glass bead, glass flake, clay, molybdenum disulfide, wollastonite, titanium oxide, zinc oxide, calcium polyphosphate and graphite. The surface of the filler may be treated with a known coupling agent (for example, silane coupling agent or titanate coupling agent) or another surface treatment agent.

Among these fillers, the glass fiber is especially preferable to improve further the creep resistance. The type of the glass fiber is not specifically limited but may be any glass fiber generally used for reinforcement of resin and selected among, for example, long fibers and short fibers like chopped strands and milled fibers. The glass fiber is preferably alkalescent to have the favorable mechanical strength. Specifically the glass fiber having the silicon oxide content of 50 to 80 percent by weight is preferable, and the glass fiber having the silicon oxide content of 65 to 77 percent by weight is more preferable. The glass fiber is preferably treated with, e.g., an epoxy, urethane, or acrylic covering agent or binder, and using the epoxy agent is especially preferable. The glass fiber is preferably treated with, e.g., a silane or titanate coupling agent or another surface treatment agent, and using an epoxy silane or aminosilane coupling agent is especially preferable. The glass fiber may be covered or bound with a thermoplastic resin, such as ethylene/vinyl acetate copolymer, or a thermosetting resin, such as epoxy resin. Two or more different types of fillers may be used together.

The content of the filler is preferably not less than 10 parts by weight, more preferably not less than 20 parts by weight and further more preferably not less than 30 parts by weight relative to 100 parts by weight of the wholly aromatic liquid crystalline polyester, while being preferably not greater than 200 parts by weight, more preferably not greater than 150 parts by weight and further more preferable not greater than 100 parts by weight.

Any of general additives selected from the following may be further added to the wholly aromatic liquid crystalline polyester resin composition, in a specific range that does not damage the advantageous effects: antioxidants, heat stabilizers (e.g., hindered phenol, hydroquinone, phosphites and their substitutes), UV absorbers (e.g., resorcinol and salicylate), color protection agents such as phosphites and hypophosphites, lubricants, mold release agents (e.g., montanic acid and its metal salts, its esters, its half esters, stearyl alcohol, stearamide and polyethylene wax), coloring agents containing dyes or pigments, carbon black functioning as conductive agent or coloring agent, crystal nucleating agents, plasticizers, flame retardants (e.g., bromine flame retardants, phosphorus flame retardants, red phosphorus, silicone flame retardants), flame retardant aids and antistatic agents. A polymer other than the wholly aromatic liquid crystalline polyester may be added to the resin composition, to provide specified properties additionally.

The method of adding the filler and the other additives to the wholly aromatic liquid crystalline polyester is not specifically limited but may be dry blending, solution mixing, addition during polymerization of the wholly aromatic liquid crystalline polyester, or melt-kneading. Especially preferable is melt-kneading. Known methods may be employed for melt-kneading: for example, Banbury mixer, rubber roller, kneader, single-screw extruder and twin-screw extruder, and using the twin-screw extruder is especially preferable. The temperature of melt-kneading is not lower than the melting point of the wholly aromatic liquid crystalline polyester and not higher than the melting point +50° C.

Any of the following methods may be employed for kneading: (1) loading the wholly aromatic liquid crystalline polyester, the filler and the other additives all together from a main feeder to knead (simultaneous kneading method); (2) loading the wholly aromatic liquid crystalline polyester and the other additives together from a main feeder to knead and subsequently adding the filler and the other additives as needed basis from a side feeder to knead (side feeding method); and (3) preparing wholly aromatic liquid crystalline polyester resin composition (master pellets) containing the high concentrations of the wholly aromatic liquid crystalline polyester and the other additives and subsequently kneading the master pellets with the wholly aromatic liquid crystalline polyester and the filler to control the concentrations to specified levels (master pellet method).

The wholly aromatic liquid crystalline polyester resin composition produced by kneading the wholly aromatic liquid crystalline polyester, the filler and others may be formed to a molded product having excellent surface appearance (color tone) and mechanical properties, heat resistance and fire resistance by known melt molding such as injection molding, injection compression molding, compression molding, extrusion molding, blow molding, press moding or spinning. The molded product may be any of injection molded products, extrusion molded products, press molded products, sheets, pipes, various films including non-oriented films, uniaxially-oriented films, biaxially-oriented films and various fibers including non-drawn fibers, drawn fibers and ultra-drawn fibers. Especially preferable is the injection molded product that has the remarkable advantageous effects and significantly reduces mold deposit.

The molded product obtained from the wholly aromatic liquid crystalline polyester or the wholly aromatic liquid crystalline polyester resin composition may be used for, for example: electric and electronic components, such as various gears, various casings, sensors, LED lamps, connectors, sockets, resistors, relay cases, relay bases, relay spools, switches, coil bobbins, capacitors, variable capacitor cases, optical pickups, oscillators, various terminal strips and boards, transformers, plugs, printed circuit boards, tuners, speakers, microphones, headphones, small motors, magnetic head bases, power modules, housings, semiconductors, liquid crystal display components, FDD carriages, FDD chassis, HDD components, motor brush holders, parabola antennas, and computer components; domestic and office electric appliance components, such as video tape recorder components, TV set components, irons, hair dryers, rice cooker components, microwave oven components, acoustic components, audio equipment components for audios, laserdiscs and compact disks, lighting components, refrigerator components, air conditioner components, typewriter components and word processor components; optical equipment and precision machine components, such as office computer components, telephone components, facsimile components, copy machine components, cleaning jigs, various bearings including oilless bearings, stern bearings and submerged bearings, motor components, machine components for lighters and typewriters, microscopes, binoculars, cameras and watches; and automobile and vehicle components, such as alternator terminals, alternator connectors, IC regulators, potentiometer bases for light dimmers, various valves including emission valves, various pipes for fuel, exhaust system, and air intake system, air intake nozzle snorkels, intake manifolds, fuel pumps, engine coolant joints, carburetor main bodies, carburetor spacers, emission sensors, coolant sensors, oil temperature sensors, throttle position sensors, crankshaft position sensors, air flowmeters, brake pad wear sensors, thermostat bases for air conditioners, motor insulators for air conditioners, vehicle motor insulators for power windows, hot air flow control valves, brush holders for radiator motors, water pump impellers, turbine vanes, wiper motor components, distributors, starter switches, starter relays, transmission wire harnesses, windshield washer nozzles, air conditioner panel switch plates, fuel solenoid valve coils, fuse connectors, horn terminals, electric component insulators, step motor rotors, lamp bezels, lamp sockets, lamp reflectors, lamp housings, brake pistons, solenoid bobbins, engine oil filters and ignition cases. This molded product is especially useful for printed circuit boards.

EXAMPLES

The following describes our polyesters and methods more in detail with reference to examples, although the scope of this disclosure is not limited to these examples.

The methods described below were employed for composition analysis, measurement of the amounts of terminal groups, measurement of absolute number-average molecular weight, measurement of melting point and measurement of melt viscosity.

(1) Composition Analysis of Wholly Aromatic Liquid Crystalline Polyester

Composition analysis of the wholly aromatic liquid crystalline was performed by $^1$H-nuclear magnetic resonance spectroscopy ($^1$H-NMR). The wholly aromatic liquid crystalline polyester of 50 mg was weighed in an NMR sample tube, was dissolved in 800 μl of a solvent, pentafluorophenol/1,1,2,2,-tetrachloroethane-d$_2$ (mixing ratio: 65/35 w/w %), and was subjected to $^1$H-NMR spectroscopy under the conditions of the spectral frequency of 500 MHz and the temperature of 80° C. with UNITY INOVA 500 NMR spectrometer (manufactured by Varian, Inc). The composition was analyzed from the ratio of the areas of peaks corresponding to the respective structural units observed in the spectral range of 7 to 9.5 ppm.

(2) Measurement of Amounts of Terminal Groups of Wholly Aromatic Liquid Crystalline Polyester Among the terminal groups of the wholly aromatic liquid crystalline polyester, the terminal carboxyl group and the terminal hydroxyl group were measured by $^{13}$C-nuclear magnetic resonance spectroscopy ($^{13}$C-NMR). The wholly aromatic liquid crystalline polyester of 50 mg was weighed in an NMR sample tube, was dissolved in 800 μl of the solvent, pentafluorophenol/1,1,2,2,-tetrachloroethane-d$_2$ (mixing ratio: 65/35 w/w %), and was subjected to $^{13}$C-NMR spectroscopy under the conditions of the spectral frequency of 126 MHz and the temperature of 80° C. with UNITY INOVA 500 NMR spectrometer (manufactured by Varian, Inc). The amounts of the terminal groups were obtained from the ratios of the area of a peak corresponding to the terminal carboxyl group observed in the spectral range of 164 to 165 ppm and the area of a peak corresponding to carbon adjacent to the terminal hydroxyl group observed in the spectral range of 115 to 115.5 ppm to the area of a peak corresponding to the polymer main chain backbone carbon.

With respect to the terminal acetyl group, the wholly aromatic liquid crystalline polyester of 50 mg was weighed in an NMR sample tube, was dissolved in 800 μl of the solvent, pentafluorophenol/1,1,2,2,-tetrachloroethane-d$_2$ (mixing ratio: 65/35 w/w %), and was subjected to $^1$H-NMR spectroscopy under the conditions of the spectral frequency of 500 MHz and the temperature of 80° C. with UNITY INOVA 500 NMR spectrometer (manufactured by Varian, Inc). The amount of the terminal group was obtained from the ratio of the area of a peak corresponding to the terminal acetyl group observed in the spectral range of 2.5 ppm to the area of the peak corresponding to the polymer main chain backbone.

(3) Measurement of Absolute Number-Average Molecular Weight of Wholly Aromatic Liquid Crystalline Polyester The absolute number-average molecular weight of the wholly aromatic liquid crystalline polyester was measured by gel permeation chromatography (GPC)/LALLS method under the following conditions:

(GPC)
GPC Apparatus: Manufactured by Waters Corporation
Detector: Differential refractive index detector R12410 (manufactured by Waters Corporation)
Column: Shodex K-806M (two) and K-802 (one) (manufactured by Showa Denko K.K.)
Eluent: Pentafluorophenol/chloroform (35/65 w/w %)
Measurement Temperature: 23° C.
Flow Rate: 0.8 mL/min
Sample Injection Volume: 200 μL (Concentration: 0.1%)
(LALLS)
Device: Low-angle laser light scattering photometer KMX-6 (manufactured by Chromatix, Inc.)
Detector Wavelength: 633 nm (He—Ne)
Detector Temperature: 23° C.

(4) Measurement of Tm (Melting Point) of Wholly Aromatic Liquid Crystalline Polyester An endothermic peak temperature (Tm2) observed by differential scanning calorimeter DSC-7 (manufactured by PerkinElmer, Inc.) was specified as the melting point, in which after observation of an endothermic peak temperature (Tm1) in measurement under the heating condition of at a rate of 20° C./minute from room temperature, the temperature was sequentially maintained at Tm1+20° C. for 5 minutes, then decreased to room temperature at a rate of 20° C./minute, and increased again at a rate of 20° C./minute. In Preparation Examples described below, the melting point is expressed as Tm.

(5) Measurement of Melt Viscosity of Wholly Aromatic Liquid Crystalline Polyester The melt viscosity was measured at the shear rate of 1000/s at the temperatures described in the respective Preparation Examples by Koka-type flow tester CFT-500D (orifice: 0.5φ× 10 mm) (manufactured by Shimadzu Corporation).

As the wholly aromatic liquid crystalline polyester, eighteen different wholly aromatic liquid crystalline polyesters (a-1) to (a-18) were prepared in Preparation Examples 1 to 18. Each of the prepared wholly aromatic liquid crystalline polyesters was subjected to composition analysis, measurement of the amounts of terminal groups, measurement of absolute number-average molecular weight, measurement of melting point (Tm) and measurement of melt viscosity as described above. The following describes the processes of preparing the respective wholly aromatic liquid crystalline polyesters and the measurement results of the respective wholly aromatic liquid crystalline polyesters.

Preparation Example 1

In a 5 L reaction vessel with stirring blades and a distillation pipe, 932 parts by weight of p-hydroxybenzoic acid, 251 parts by weight of 4,4'-dihydroxybiphenyl, 99 parts by weight of hydroquinone, 284 parts by weight of terephthalic acid, 90 parts by weight of isophthalic acid, 5 parts by weight of hydroquinone as excess addition of hydroquinone and 1262 parts by weight of acetic anhydride (1.09 equivalents of the total amount of phenolic hydroxyl group) were mixed, were reacted with stirring in nitrogen atmosphere at 145° C. for 1 hour and were then heated to 350° C. in 4 hours. The reaction mixture was heated with controlling the reflux amount and the distillation amount of acetic acid produced by the reaction to have the removal rate of 71% at the temperature of 250° C. The reaction further proceeded with keeping the polymerization temperature at 350° C. and reducing the pressure to 1.0 mmHg (133 Pa) in 1.0 hour. The polymerization was terminated when the torque required for stirring reached 15 kg·cm. The reaction vessel was then pressurized to 1.0 kg/cm² (0.1 MPa), and the polymer was formed in strands through nozzles each having a circular outlet of 10 mm in diameter and was pelletized with a cutter to the wholly aromatic liquid crystalline polyester (a-1).

This wholly aromatic liquid crystalline polyester (a-1) had Tm of 333° C., the absolute number-average molecular weight of 9800, and the melt viscosity of 45 Pa·s measured at the shear rate of 1000/s and the temperature of 343° C. As the results of composition analysis by the above method, the content of the hydroquinone-derived structural unit to the total amount of the structural units was 8.0 mole percent. The ratio of the p-hydroxybenzoic acid-derived structural unit (structural unit (I)) to the sum of the p-hydroxybenzoic acid-derived structural unit (structural unit (I)), the 4,4'-dihydroxybiphenyl-derived structural unit (structural unit (II)) and the hydroquinone-derived structural unit (structural unit (III)) was 75 mole percent. The ratio of the 4,4'-dihydroxybiphenyl-derived structural unit (structural unit (II)) to the sum of the 4,4'-dihydroxybiphenyl-derived structural unit (structural unit (II)) and the hydroquinone-derived structural unit (structural unit (III)) was 60 mole percent. The ratio of the terephthalic acid-derived structural unit (structural unit (IV)) to the sum of the terephthalic acid-derived structural unit (structural unit (IV)) and the isophthalic acid-derived structural unit (structural unit (V)) was 76 mole percent. The total amount of the 4,4'-dihydroxybiphenyl-derived structural unit (structural unit (II)) and the hydroquinone-derived structural unit (structural unit (III)) was substantially equimolar with the total amount of the terephthalic acid-derived structural unit (structural unit (IV)) and the isophthalic acid-derived structural unit (structural unit (V)).

As the results of measurement of the amounts of terminal groups by the above method, the amount (a) of terminal hydroxyl group was 60 equivalents/(g·10$^{-6}$), the amount (b) of terminal acetyl group was 40 equivalents/(g·10$^{-6}$), and the amount (c) of terminal carboxyl group was 90 equivalents/(g·10$^{-6}$). The ratio [(a)+(b)]/(c) of the sum of the amount of terminal hydroxyl group and the amount of terminal acetyl group to the amount of terminal carboxyl group was 1.11.

Preparation Example 2

In a 5 L reaction vessel with stirring blades and a distillation pipe, 845 parts by weight of p-hydroxybenzoic acid, 375 parts by weight of 4,4'-dihydroxybiphenyl, 95 parts by weight of hydroquinone, 301 parts by weight of terephthalic acid, 177 parts by weight of isophthalic acid, 5 parts by weight of hydroquinone as excess addition of hydroquinone and 1332 parts by weight of acetic anhydride (1.09 equivalents of the total amount of phenolic hydroxyl group) were mixed, were reacted with stirring in nitrogen atmosphere at 145° C. for 1 hour and were then heated to 330° C. in 4 hours. The reaction mixture was heated with controlling the reflux amount and the distillation amount of acetic acid produced by the reaction to have the removal rate of 72% at the temperature of 250° C. The reaction further proceeded with keeping the polymerization temperature at 330° C. and reducing the pressure to 1.0 mmHg (133 Pa) in 1.0 hour. The polymerization was terminated when the torque required for stirring reached 20 kg·cm. The reaction vessel was then pressurized to 1.0 kg/cm² (0.1 MPa), and the polymer was formed in strands through nozzles each having a circular outlet of 10 mm in diameter and was pelletized with a cutter to the wholly aromatic liquid crystalline polyester (a-2).

This wholly aromatic liquid crystalline polyester (a-2) had Tm of 315° C., the absolute number-average molecular weight of 10500, and the melt viscosity of 42 Pa·s measured at the shear rate of 1000/s and the temperature of 325° C. As the results of composition analysis by the above method, the content of the hydroquinone-derived structural unit to the total amount of the structural units was 7.3 mole percent. The ratio of the structural unit (I) to the sum of the structural unit (I), the structural unit (II) and the structural unit (III) was 68 mole percent. The ratio of the structural unit (II) to the sum of the structural unit (II) and the structural unit (III) was 70 mole percent. The ratio of the structural unit (IV) to the sum of the structural unit (IV) and the structural unit (V) was 63 mole percent. The total amount of the structural unit (II) and the structural unit (III) was substantially equimolar with the total amount of the structural unit (IV) and the structural unit (V).

As the results of measurement of the amounts of terminal groups by the above method, the amount (a) of terminal hydroxyl group was 60 equivalents/(g·10$^{-6}$), the amount (b) of terminal acetyl group was 50 equivalents/(g·10$^{-6}$), the amount (c) of terminal carboxyl group was 94 equivalents/(g·10$^{-6}$), and the ratio [(a)+(b)]/(c) was 1.17.

Preparation Example 3

In a 5 L reaction vessel with stirring blades and a distillation pipe, 957 parts by weight of p-hydroxybenzoic acid, 224 parts by weight of 4,4'-dihydroxybiphenyl, 96 parts by weight of hydroquinone, 241 parts by weight of terephthalic acid, 103 parts by weight of isophthalic acid and 1232 parts by weight of acetic anhydride (1.09 equivalents of the total amount of phenolic hydroxyl group) were mixed, were reacted with stirring in nitrogen atmosphere at 145° C. for 1 hour and were then heated to 360° C. in 4 hours. The reaction mixture was heated with controlling the reflux amount and the distillation amount of acetic acid produced by the reaction to have the removal rate of 68% at the temperature of 250° C. The reaction further proceeded with keeping the polymerization temperature at 360° C. and reducing the pressure to 1.0 mmHg (133 Pa) in 1.0 hour. The polymerization was terminated when the torque required for stirring reached 10 kg·cm. The reaction vessel was then pressurized to 1.0 kg/cm² (0.1 MPa), and the polymer was formed in strands through nozzles each having a circular outlet of 10 mm in diameter and was pelletized with a cutter to the wholly aromatic liquid crystalline polyester (a-3).

This wholly aromatic liquid crystalline polyester (a-3) had Tm of 336° C., the absolute number-average molecular weight of 7800, and the melt viscosity of 33 Pa·s measured at the shear rate of 1000/s and the temperature of 346° C. As the results of composition analysis by the above method, the content of the hydroquinone-derived structural unit to the total amount of the structural units was 7.9 mole percent. The ratio of the structural unit (I) to the sum of the structural unit (I), the structural unit (II) and the structural unit (III) was 77 mole percent. The ratio of the structural unit (II) to the sum of the structural unit (II) and the structural unit (III) was 58 mole percent. The ratio of the structural unit (IV) to the sum of the structural unit (IV) and the structural unit (V) was 70 mole percent. The total amount of the structural unit (II) and the structural unit (III) was substantially equimolar with the total amount of the structural unit (IV) and the structural unit (V).

As the results of measurement of the amounts of terminal groups by the above method, the amount (a) of terminal hydroxyl group was 77.5 equivalents/(g·10$^{-6}$), the amount (b) of terminal acetyl group was 77.5 equivalents/(g·10$^{-6}$), the amount (c) of terminal carboxyl group was 131 equivalents/(g·10$^{-6}$), and the ratio [(a)+(b)]/(c) was 1.18.

Preparation Example 4

In a 5 L reaction vessel with stirring blades and a distillation pipe, 820 parts by weight of p-hydroxybenzoic acid, 399 parts by weight of 4,4'-dihydroxybiphenyl, 101 parts by weight of hydroquinone, 447 parts by weight of terephthalic acid, 61 parts by weight of isophthalic acid and 1342 parts by weight of acetic anhydride (1.09 equivalents of the total amount of phenolic hydroxyl group) were mixed, were reacted with stirring in nitrogen atmosphere at 145° C. for 1 hour and were then heated to 340° C. in 4 hours. The reaction mixture was heated with controlling the reflux amount and the distillation amount of acetic acid produced by the reaction to have the removal rate of 74% at the temperature of 250° C. The reaction further proceeded with keeping the polymerization temperature at 340° C. and reducing the pressure to 1.0 mmHg (133 Pa) in 1.0 hour. The polymerization was terminated when the torque required for stirring reached 20 kg·cm. The reaction vessel was then pressurized to 1.0 kg/cm$^2$ (0.1 MPa), and the polymer was formed in strands through nozzles each having a circular outlet of 10 mm in diameter and was pelletized with a cutter to the wholly aromatic liquid crystalline polyester (a-4).

This wholly aromatic liquid crystalline polyester (a-4) had Tm of 327° C., the absolute number-average molecular weight of 10200, and the melt viscosity of 42 Pa·s measured at the shear rate of 1000/s and the temperature of 337° C. As the results of composition analysis by the above method, the content of the hydroquinone-derived structural unit to the total amount of the structural units was 7.6 mole percent. The ratio of the structural unit (I) to the sum of the structural unit (I), the structural unit (II) and the structural unit (III) was 66 mole percent. The ratio of the structural unit (II) to the sum of the structural unit (II) and the structural unit (III) was 70 mole percent. The ratio of the structural unit (IV) to the sum of the structural unit (IV) and the structural unit (V) was 88 mole percent. The total amount of the structural unit (II) and the structural unit (III) was substantially equimolar with the total amount of the structural unit (IV) and the structural unit (V).

As the results of measurement of the amounts of terminal groups by the above method, the amount (a) of terminal hydroxyl group was 50 equivalents/(g·10$^{-6}$), the amount (b) of terminal acetyl group was 50 equivalents/(g·10$^{-6}$), the amount (c) of terminal carboxyl group was 85 equivalents/(g·10$^{-6}$), and the ratio [(a)+(b)]/(c) was 1.18.

Preparation Example 5

In a 5 L reaction vessel with stirring blades and a distillation pipe, 870 parts by weight of p-hydroxybenzoic acid, 377 parts by weight of 4,4'-dihydroxybiphenyl, 74 parts by weight of hydroquinone, 413 parts by weight of terephthalic acid, 36 parts by weight of isophthalic acid and 1302 parts by weight of acetic anhydride (1.09 equivalents of the total amount of phenolic hydroxyl group) were mixed, were reacted with stirring in nitrogen atmosphere at 145° C. for 1 hour and were then heated to 360° C. in 4 hours. The reaction mixture was heated with controlling the reflux amount and the distillation amount of acetic acid produced by the reaction to have the removal rate of 77% at the temperature of 250° C. The reaction further proceeded with keeping the polymerization temperature at 360° C. and reducing the pressure to 1.0 mmHg (133 Pa) in 1.0 hour. The polymerization was terminated when the torque required for stirring reached 10 kg·cm. The reaction vessel was then pressurized to 1.0 kg/cm$^2$ (0.1 MPa), and the polymer was formed in strands through nozzles each having a circular outlet of 10 mm in diameter and was pelletized with a cutter to the wholly aromatic liquid crystalline polyester (a-5).

This wholly aromatic liquid crystalline polyester (a-5) had Tm of 345° C., the absolute number-average molecular weight of 8800, and the melt viscosity of 35 Pa·s measured at the shear rate of 1000/s and the temperature of 355° C. As the results of composition analysis by the above method, the content of the hydroquinone-derived structural unit to the total amount of the structural units was 5.8 mole percent. The ratio of the structural unit (I) to the sum of the structural unit (I), the structural unit (II) and the structural unit (III) was 70 mole percent. The ratio of the structural unit (II) to the sum of the structural unit (II) and the structural unit (III) was 75 mole percent. The ratio of the structural unit (IV) to the sum of the structural unit (IV) and the structural unit (V) was 92 mole percent. The total amount of the structural unit (II) and the structural unit (III) was substantially equimolar with the total amount of the structural unit (IV) and the structural unit (V).

As the results of measurement of the amounts of terminal groups by the above method, the amount (a) of terminal hydroxyl group was 54 equivalents/(g·10$^{-6}$), the amount (b) of terminal acetyl group was 66 equivalents/(g·10$^{-6}$), the amount (c) of terminal carboxyl group was 100 equivalents/(g·10$^{-6}$), and the ratio [(a)+(b)]/(c) was 1.20.

Preparation Example 6

In a 5 L reaction vessel with stirring blades and a distillation pipe, 932 parts by weight of p-hydroxybenzoic acid, 335 parts by weight of 4,4'-dihydroxybiphenyl, 50 parts by weight of hydroquinone, 262 parts by weight of terephthalic acid, 112 parts by weight of isophthalic acid and 1252 parts by weight of acetic anhydride (1.09 equivalents of the total amount of phenolic hydroxyl group) were mixed, were reacted with stirring in nitrogen atmosphere at 145° C. for 1 hour and were then heated to 350° C. in 4 hours. The reaction mixture was heated with controlling the reflux amount and the distillation amount of acetic acid produced by the reaction to have the removal rate of 64% at the temperature of 250° C. The reaction further proceeded with keeping the polymerization temperature at 350° C. and reducing the pressure to 1.0 mmHg (133 Pa) in 1.0 hour. The polymerization was terminated when the torque required for stirring reached 10 kg·cm.

The reaction vessel was then pressurized to 1.0 kg/cm² (0.1 MPa), and the polymer was formed in strands through nozzles each having a circular outlet of 10 mm in diameter and was pelletized with a cutter to the wholly aromatic liquid crystalline polyester (a-6).

This wholly aromatic liquid crystalline polyester (a-6) had Tm of 325° C., the absolute number-average molecular weight of 9500, and the melt viscosity of 38 Pa·s measured at the shear rate of 1000/s and the temperature of 335° C. As the results of composition analysis by the above method, the content of the hydroquinone-derived structural unit to the total amount of the structural units was 4.0 mole percent. The ratio of the structural unit (I) to the sum of the structural unit (I), the structural unit (II) and the structural unit (III) was 75 mole percent. The ratio of the structural unit (II) to the sum of the structural unit (II) and the structural unit (III) was 80 mole percent. The ratio of the structural unit (IV) to the sum of the structural unit (IV) and the structural unit (V) was 70 mole percent. The total amount of the structural unit (II) and the structural unit (III) was substantially equimolar with the total amount of the structural unit (IV) and the structural unit (V).

As the results of measurement of the amounts of terminal groups by the above method, the amount (a) of terminal hydroxyl group was 50 equivalents/(g·10⁻⁶), the amount (b) of terminal acetyl group was 60 equivalents/(g·10⁻⁶), the amount (c) of terminal carboxyl group was 88 equivalents/(g·10⁻⁶), and the ratio [(a)+(b)]/(c) was 1.25.

Preparation Example 7

In a 5 L reaction vessel with stirring blades and a distillation pipe, 994 parts by weight of p-hydroxybenzoic acid, 218 parts by weight of 4,4'-dihydroxybiphenyl, 69 parts by weight of hydroquinone, 156 parts by weight of terephthalic acid, 144 parts by weight of isophthalic acid and 1202 parts by weight of acetic anhydride (1.09 equivalents of the total amount of phenolic hydroxyl group) were mixed, were reacted with stirring in nitrogen atmosphere at 145° C. for 1 hour and were then heated to 365° C. in 4 hours. The reaction mixture was heated with controlling the reflux amount and the distillation amount of acetic acid produced by the reaction to have the removal rate of 65% at the temperature of 250° C. The reaction further proceeded with keeping the polymerization temperature at 365° C. and reducing the pressure to 1.0 mmHg (133 Pa) in 1.0 hour. The polymerization was terminated when the torque required for stirring reached 10 kg·cm. The reaction vessel was then pressurized to 1.0 kg/cm² (0.1 MPa), and the polymer was formed in strands through nozzles each having a circular outlet of 10 mm in diameter and was pelletized with a cutter to the wholly aromatic liquid crystalline polyester (a-7).

This wholly aromatic liquid crystalline polyester (a-7) had Tm of 350° C., the absolute number-average molecular weight of 8900, and the melt viscosity of 32 Pa·s measured at the shear rate of 1000/s and the temperature of 360° C. As the results of composition analysis by the above method, the content of the hydroquinone-derived structural unit to the total amount of the structural units was 5.8 mole percent. The ratio of the structural unit (I) to the sum of the structural unit (I), the structural unit (II) and the structural unit (III) was 80 mole percent. The ratio of the structural unit (II) to the sum of the structural unit (II) and the structural unit (III) was 65 mole percent. The ratio of the structural unit (IV) to the sum of the structural unit (IV) and the structural unit (V) was 52 mole percent. The total amount of the structural unit (II) and the structural unit (III) was substantially equimolar with the total amount of the structural unit (IV) and the structural unit (V).

As the results of measurement of the amounts of terminal groups by the above method, the amount (a) of terminal hydroxyl group was 39 equivalents/(g·10⁻⁶), the amount (b) of terminal acetyl group was 71 equivalents/(g·10⁻⁶), the amount (c) of terminal carboxyl group was 91 equivalents/(g·10⁻⁶), and the ratio [(a)+(b)]/(c) was 1.21.

Preparation Example 8

In a 5 L reaction vessel with stirring blades and a distillation pipe, 783 parts by weight of p-hydroxybenzoic acid, 465 parts by weight of 4,4'-dihydroxybiphenyl, 92 parts by weight of hydroquinone, 498 parts by weight of terephthalic acid, 55 parts by weight of isophthalic acid and 1372 parts by weight of acetic anhydride (1.09 equivalents of the total amount of phenolic hydroxyl group) were mixed, were reacted with stirring in nitrogen atmosphere at 145° C. for 1 hour and were then heated to 360° C. in 4 hours. The reaction mixture was heated with controlling the reflux amount and the distillation amount of acetic acid produced by the reaction to have the removal rate of 69% at the temperature of 250° C. The reaction further proceeded with keeping the polymerization temperature at 360° C. and reducing the pressure to 1.0 mmHg (133 Pa) in 1.0 hour. The polymerization was terminated when the torque required for stirring reached 10 kg·cm. The reaction vessel was then pressurized to 1.0 kg/cm² (0.1 MPa), and the polymer was formed in strands through nozzles each having a circular outlet of 10 mm in diameter and was pelletized with a cutter to the wholly aromatic liquid crystalline polyester (a-8).

This wholly aromatic liquid crystalline polyester (a-8) had Tm of 337° C., the absolute number-average molecular weight of 8800, and the melt viscosity of 30 Pa·s measured at the shear rate of 1000/s and the temperature of 347° C. As the results of composition analysis by the above method, the content of the hydroquinone-derived structural unit to the total amount of the structural units was 6.8 mole percent. The ratio of the structural unit (I) to the sum of the structural unit (I), the structural unit (II) and the structural unit (III) was 63 mole percent. The ratio of the structural unit (II) to the sum of the structural unit (II) and the structural unit (III) was 75 mole percent. The ratio of the structural unit (IV) to the sum of the structural unit (IV) and the structural unit (V) was 90 mole percent. The total amount of the structural unit (II) and the structural unit (III) was substantially equimolar with the total amount of the structural unit (IV) and the structural unit (V).

As the results of measurement of the amounts of terminal groups by the above method, the amount (a) of terminal hydroxyl group was 56 equivalents/(g·10⁻⁶), the amount (b) of terminal acetyl group was 69 equivalents/(g·10⁻⁶), the amount (c) of terminal carboxyl group was 103 equivalents/(g·10⁻⁶), and the ratio [(a)+(b)]/(c) was 1.21.

Preparation Example 9

In a 5 L reaction vessel with stirring blades and a distillation pipe, 1019 parts by weight of p-hydroxybenzoic acid, 241 parts by weight of 4,4'-dihydroxybiphenyl, 36 parts by weight of hydroquinone, 121 parts by weight of terephthalic acid, 148 parts by weight of isophthalic acid and 1182 parts by weight of acetic anhydride (1.09 equivalents of the total amount of phenolic hydroxyl group) were mixed, were reacted with stirring in nitrogen atmosphere at 145° C. for 1 hour and were then heated to 360° C. in 4 hours. The reaction mixture was heated with controlling the reflux amount and the distillation amount of acetic acid produced by the reaction to have the removal rate of 77% at the temperature of 250° C.

The reaction further proceeded with keeping the polymerization temperature at 360° C. and reducing the pressure to 1.0 mmHg (133 Pa) in 1.0 hour. The polymerization was terminated when the torque required for stirring reached 10 kg·cm. The reaction vessel was then pressurized to 1.0 kg/cm² (0.1 MPa), and the polymer was formed in strands through nozzles each having a circular outlet of 10 mm in diameter and was pelletized with a cutter to the wholly aromatic liquid crystalline polyester (a-9).

This wholly aromatic liquid crystalline polyester (a-9) had Tm of 340° C., the absolute number-average molecular weight of 9250, and the melt viscosity of 32 Pa·s measured at the shear rate of 1000/s and the temperature of 350° C. As the results of composition analysis by the above method, the content of the hydroquinone-derived structural unit to the total amount of the structural units was 3.1 mole percent. The ratio of the structural unit (I) to the sum of the structural unit (I), the structural unit (II) and the structural unit (III) was 82 mole percent. The ratio of the structural unit (II) to the sum of the structural unit (II) and the structural unit (III) was 80 mole percent. The ratio of the structural unit (IV) to the sum of the structural unit (IV) and the structural unit (V) was 45 mole percent. The total amount of the structural unit (II) and the structural unit (III) was substantially equimolar with the total amount of the structural unit (IV) and the structural unit (V).

As the results of measurement of the amounts of terminal groups by the above method, the amount (a) of terminal hydroxyl group was 30 equivalents/(g·$10^{-6}$), the amount (b) of terminal acetyl group was 55 equivalents/(g·$10^{-6}$), the amount (c) of terminal carboxyl group was 79 equivalents/(g·$10^{-6}$), and the ratio [(a)+(b)]/(c) was 1.08.

Preparation Example 10

In a 5 L reaction vessel with stirring blades and a distillation pipe, 870 parts by weight of p-hydroxybenzoic acid, 277 parts by weight of 4,4'-dihydroxybiphenyl, 134 parts by weight of hydroquinone, 395 parts by weight of terephthalic acid, 54 parts by weight of isophthalic acid and 1302 parts by weight of acetic anhydride (1.09 equivalents of the total amount of phenolic hydroxyl group) were mixed, were reacted with stirring in nitrogen atmosphere at 145° C. for 1 hour and were then heated to 360° C. in 4 hours. The reaction mixture was heated with controlling the reflux amount and the distillation amount of acetic acid produced by the reaction to have the removal rate of 63% at the temperature of 250° C. The reaction further proceeded with keeping the polymerization temperature at 360° C. and reducing the pressure to 1.0 mmHg (133 Pa) in 1.0 hour. The polymerization was terminated when the torque required for stirring reached 10 kg·cm. The reaction vessel was then pressurized to 1.0 kg/cm² (0.1 MPa), and the polymer was formed in strands through nozzles each having a circular outlet of 10 mm in diameter and was pelletized with a cutter to the wholly aromatic liquid crystalline polyester (a-10).

This wholly aromatic liquid crystalline polyester (a-10) had Tm of 347° C., the absolute number-average molecular weight of 6900, and the melt viscosity of 23 Pa·s measured at the shear rate of 1000/s and the temperature of 357° C. As the results of composition analysis by the above method, the content of the hydroquinone-derived structural unit to the total amount of the structural units was 10.4 mole percent. The ratio of the structural unit (I) to the sum of the structural unit (I), the structural unit (II) and the structural unit (III) was 70 mole percent. The ratio of the structural unit (II) to the sum of the structural unit (II) and the structural unit (III) was 55 mole percent. The ratio of the structural unit (IV) to the sum of the structural unit (IV) and the structural unit (V) was 88 mole percent. The total amount of the structural unit (II) and the structural unit (III) was substantially equimolar with the total amount of the structural unit (IV) and the structural unit (V).

As the results of measurement of the amounts of terminal groups by the above method, the amount (a) of terminal hydroxyl group was 67.5 equivalents/(g·$10^{-6}$), the amount (b) of terminal acetyl group was 67.5 equivalents/(g·$10^{-6}$), the amount (c) of terminal carboxyl group was 106 equivalents/(g·$10^{-6}$), and the ratio [(a)+(b)]/(c) was 1.27.

Preparation Example 11

In a 5 L reaction vessel with stirring blades and a distillation pipe, 845 parts by weight of p-hydroxybenzoic acid, 375 parts by weight of 4,4'-dihydroxybiphenyl, 95 parts by weight of hydroquinone, 301 parts by weight of terephthalic acid, 177 parts by weight of isophthalic acid, 5 parts by weight of hydroquinone as excess addition of hydroquinone and 1332 parts by weight of acetic anhydride (1.09 equivalents of the total amount of phenolic hydroxyl group) were mixed, were reacted with stirring in nitrogen atmosphere at 145° C. for 1 hour and were then heated to 330° C. in 4 hours. The reaction mixture was heated with decreasing the reflux amount of acetic acid produced by the reaction for acceleration of the reaction and increasing the distillation rate to have the removal rate of 84% at the temperature of 250° C. The reaction further proceeded with keeping the polymerization temperature at 330° C. and reducing the pressure to 1.0 mmHg (133 Pa) in 1.0 hour. The polymerization was terminated when the torque required for stirring reached 20 kg·cm. The reaction vessel was then pressurized to 1.0 kg/cm² (0.1 MPa), and the polymer was formed in strands through nozzles each having a circular outlet of 10 mm in diameter and was pelletized with a cutter to the wholly aromatic liquid crystalline polyester (a-11).

This wholly aromatic liquid crystalline polyester (a-11) had Tm of 314° C., the absolute number-average molecular weight of 14600, and the melt viscosity of 48 Pa·s measured at the shear rate of 1000/s and the temperature of 324° C. As the results of composition analysis by the above method, the content of the hydroquinone-derived structural unit to the total amount of the structural units was 7.3 mole percent. The ratio of the structural unit (I) to the sum of the structural unit (I), the structural unit (II) and the structural unit (III) was 68 mole percent. The ratio of the structural unit (II) to the sum of the structural unit (II) and the structural unit (III) was 70 mole percent. The ratio of the structural unit (IV) to the sum of the structural unit (IV) and the structural unit (V) was 63 mole percent. The total amount of the structural unit (II) and the structural unit (III) was substantially equimolar with the total amount of the structural unit (IV) and the structural unit (V).

As the results of measurement of the amounts of terminal groups by the above method, the amount (a) of terminal hydroxyl group was 24 equivalents/(g·$10^{-6}$), the amount (b) of terminal acetyl group was 24 equivalents/(g·$10^{-6}$), the amount (c) of terminal carboxyl group was 51 equivalents/(g·$10^{-6}$), and the ratio [(a)+(b)]/(c) was 0.94.

Preparation Example 12

In a 5 L reaction vessel with stirring blades and a distillation pipe, 845 parts by weight of p-hydroxybenzoic acid, 375 parts by weight of 4,4'-dihydroxybiphenyl, 95 parts by weight of hydroquinone, 301 parts by weight of terephthalic acid, 177 parts by weight of isophthalic acid, 5 parts by weight of hydroquinone as excess addition of hydroquinone and 1332 parts by weight of acetic anhydride (1.09 equivalents of the total amount of phenolic hydroxyl group) were mixed, were reacted with stirring in nitrogen atmosphere at 145° C. for 1 hour and were then heated according to a 4-hour heating program to 330° C. The heating program heated the reaction mixture with increasing the reflux amount of acetic acid produced by the reaction and decreasing the distillation amount by enhanced cooling of a rectifier to have the removal rate of 48% at the temperature of 250° C. The increase in reflux amount of acetic acid slowed the polymerization temperature increase and thereby extended the heating time to 330° C. to 5 hours. The reaction further proceeded with keeping the polymerization temperature at 330° C. and reducing the pressure to 1.0 mmHg (133 Pa) in 1.0 hour. The polymerization was terminated when the torque required for stirring reached 20 kg·cm. The reaction vessel was then pressurized to 1.0 kg/cm² (0.1 MPa), and the polymer was formed in strands through nozzles each having a circular outlet of 10 mm in diameter and was pelletized with a cutter to the wholly aromatic liquid crystalline polyester (a-12).

This wholly aromatic liquid crystalline polyester (a-12) had Tm of 309° C., the absolute number-average molecular weight of 9800, and the melt viscosity of 37 Pa·s measured at the shear rate of 1000/s and the temperature of 319° C. As the results of composition analysis by the above method, the content of the hydroquinone-derived structural unit to the total amount of the structural units was 6.7 mole percent. This value was less than the hydroquinone content calculated from the amount of the material monomer by 0.6 mole percent, which indicated a variation in composition during polymerization. The ratio of the structural unit (I) to the sum of the structural unit (I), the structural unit (II) and the structural unit (III) was 67 mole percent. The ratio of the structural unit (II) to the sum of the structural unit (II) and the structural unit (III) was 73 mole percent. The ratio of the structural unit (IV) to the sum of the structural unit (IV) and the structural unit (V) was 63 mole percent. The total amount of the structural unit (II) and the structural unit (III) was substantially equimolar with the total amount of the structural unit (IV) and the structural unit (V).

As the results of measurement of the amounts of terminal groups by the above method, the amount (a) of terminal hydroxyl group was 43 equivalents/(g·10⁻⁶), the amount (b) of terminal acetyl group was 48 equivalents/(g·10⁻⁶), the amount (c) of terminal carboxyl group was 93 equivalents/(g·10⁻⁶), and the ratio [(a)+(b)]/(c) was 0.98.

Preparation Example 13

In a 5 L reaction vessel with stirring blades and a distillation pipe, 932 parts by weight of p-hydroxybenzoic acid, 251 parts by weight of 4,4'-dihydroxybiphenyl, 99 parts by weight of hydroquinone, 284 parts by weight of terephthalic acid, 90 parts by weight of isophthalic acid and 1252 parts by weight of acetic anhydride (1.09 equivalents of the total amount of phenolic hydroxyl group) were mixed, were reacted with stirring in nitrogen atmosphere at 145° C. for 1 hour and were then heated to 350° C. in 4 hours. The reaction mixture was heated with controlling the reflux amount and the distillation amount of acetic acid produced by the reaction to have the removal rate of 74% at the temperature of 250° C. The reaction further proceeded with keeping the polymerization temperature at 350° C. and reducing the pressure to 1.0 mmHg (133 Pa) in 1.0 hour. The polymerization was terminated when the torque required for stirring reached 5 kg·cm. The reaction vessel was then pressurized to 1.0 kg/cm² (0.1 MPa), and the polymer was formed in strands through nozzles each having a circular outlet of 10 mm in diameter and was pelletized with a cutter to the wholly aromatic liquid crystalline polyester (a-13).

This wholly aromatic liquid crystalline polyester (a-13) had Tm of 335° C., the absolute number-average molecular weight of 4200, and the melt viscosity of 9 Pa·s measured at the shear rate of 1000/s and the temperature of 345° C. As the results of composition analysis by the above method, the content of the hydroquinone-derived structural unit to the total amount of the structural units was 8.0 mole percent. The ratio of the structural unit (I) to the sum of the structural unit (I), the structural unit (II) and the structural unit (III) was 75 mole percent. The ratio of the structural unit (II) to the sum of the structural unit (II) and the structural unit (III) was 60 mole percent. The ratio of the structural unit (IV) to the sum of the structural unit (IV) and the structural unit (V) was 76 mole percent. The total amount of the structural unit (II) and the structural unit (III) was substantially equimolar with the total amount of the structural unit (IV) and the structural unit (V).

As the results of measurement of the amounts of terminal groups by the above method, the amount (a) of terminal hydroxyl group was 103 equivalents/(g·10⁻⁶), the amount (b) of terminal acetyl group was 307 equivalents/(g·10⁻⁶), the amount (c) of terminal carboxyl group was 290 equivalents/(g·10⁻⁶), and the ratio [(a)+(b)]/(c) was 1.41.

Preparation Example 14

In a 5 L reaction vessel with stirring blades and a distillation pipe, 808 parts by weight of p-hydroxybenzoic acid, 235 parts by weight of 4,4'-dihydroxybiphenyl, 208 parts by weight of hydroquinone, 419 parts by weight of terephthalic acid, 105 parts by weight of isophthalic acid and 1352 parts by weight of acetic anhydride (1.09 equivalents of the total amount of phenolic hydroxyl group) were mixed, were reacted with stirring in nitrogen atmosphere at 145° C. for 1 hour and were then heated to 320° C. in 4 hours. The reaction mixture was heated with controlling the reflux amount and the distillation amount of acetic acid produced by the reaction to have the removal rate of 75% at the temperature of 250° C. The reaction further proceeded with keeping the polymerization temperature at 320° C. and reducing the pressure to 1.0 mmHg (133 Pa) in 1.0 hour. The polymerization was terminated when the torque required for stirring reached 25 kg·cm. The reaction vessel was then pressurized to 1.0 kg/cm² (0.1 MPa), and the polymer was formed in strands through nozzles each having a circular outlet of 10 mm in diameter and was pelletized with a cutter to the wholly aromatic liquid crystalline polyester (a-14).

This wholly aromatic liquid crystalline polyester (a-14) had Tm of 311° C., the absolute number-average molecular weight of 8900, and the melt viscosity of 38 Pa·s measured at the shear rate of 1000/s and the temperature of 321° C. As the results of composition analysis by the above method, the content of the hydroquinone-derived structural unit to the total amount of the structural units was 15.6 mole percent. The ratio of the structural unit (I) to the sum of the structural unit (I), the structural unit (II) and the structural unit (III) was 65 mole percent. The ratio of the structural unit (II) to the sum of the structural unit (II) and the structural unit (III) was 40 mole percent. The ratio of the structural unit (IV) to the sum of the structural unit (IV) and the structural unit (V) was 80 mole percent. The total amount of the structural unit (II) and the structural unit (III) was substantially equimolar with the total amount of the structural unit (IV) and the structural unit (V).

As the results of measurement of the amounts of terminal groups by the above method, the amount (a) of terminal hydroxyl group was 38 equivalents/(g·10$^{-6}$), the amount (b) of terminal acetyl group was 47 equivalents/(g·10$^{-6}$), the amount (c) of terminal carboxyl group was 65 equivalents/(g·10$^{-6}$), and the ratio [(a)+(b)]/(c) was 1.31.

Preparation Example 15

In a 5 L reaction vessel with stirring blades and a distillation pipe, 994 parts by weight of p-hydroxybenzoic acid, 302 parts by weight of 4,4'-dihydroxybiphenyl, 20 parts by weight of hydroquinone, 164 parts by weight of terephthalic acid, 135 parts by weight of isophthalic acid and 1202 parts by weight of acetic anhydride (1.09 equivalents of the total amount of phenolic hydroxyl group) were mixed, were reacted with stirring in nitrogen atmosphere at 145° C. for 1 hour and were then heated to 360° C. in 4 hours. The reaction mixture was heated with controlling the reflux amount and the distillation amount of acetic acid produced by the reaction to have the removal rate of 78% at the temperature of 250° C. The reaction further proceeded with keeping the polymerization temperature at 360° C. and reducing the pressure to 1.0 mmHg (133 Pa) in 1.0 hour. The polymerization was terminated when the torque required for stirring reached 20 kg·cm. The reaction vessel was then pressurized to 1.0 kg/cm$^2$ (0.1 MPa), and the polymer was formed in strands through nozzles each having a circular outlet of 10 mm in diameter and was pelletized with a cutter to the wholly aromatic liquid crystalline polyester (a-15).

This wholly aromatic liquid crystalline polyester (a-15) had Tm of 344° C., the absolute number-average molecular weight of 9400, and the melt viscosity of 42 Pa·s measured at the shear rate of 1000/s and the temperature of 354° C. As the results of composition analysis by the above method, the content of the hydroquinone-derived structural unit to the total amount of the structural units was 1.7 mole percent. The ratio of the structural unit (I) to the sum of the structural unit (I), the structural unit (II) and the structural unit (III) was 80 mole percent. The ratio of the structural unit (II) to the sum of the structural unit (II) and the structural unit (III) was 90 mole percent. The ratio of the structural unit (IV) to the sum of the structural unit (IV) and the structural unit (V) was 55 mole percent. The total amount of the structural unit (II) and the structural unit (III) was substantially equimolar with the total amount of the structural unit (IV) and the structural unit (V).

As the results of measurement of the amounts of terminal groups by the above method, the amount (a) of terminal hydroxyl group was 51 equivalents/(g·10$^{-6}$), the amount (b) of terminal acetyl group was 34 equivalents/(g·10$^{-6}$), the amount (c) of terminal carboxyl group was 78 equivalents/(g·10$^{-6}$), and the ratio [(a)+(b)]/(c) was 1.09.

Preparation Example 16

In a 5 L reaction vessel with stirring blades and a distillation pipe, 920 parts by weight of p-hydroxybenzoic acid, 268 parts by weight of 4,4'-dihydroxybiphenyl, 109 parts by weight of hydroquinone, 299 parts by weight of terephthalic acid, 90 parts by weight of isophthalic acid, 5 parts by weight of hydroquinone as excess addition of hydroquinone and 1304 parts by weight of acetic anhydride (1.10 equivalents of the total amount of phenolic hydroxyl group) were mixed, were reacted with stirring in nitrogen atmosphere at 147° C. for 1 hour and were then heated to 350° C. in 4 hours. The reaction mixture was heated with controlling the reflux amount and the distillation amount of acetic acid produced by the reaction to have the removal rate of 70% at the temperature of 250° C. The reaction further proceeded with keeping the polymerization temperature at 350° C. and reducing the pressure to 1.0 mmHg (133 Pa) in 1.0 hour. The polymerization was terminated when the torque required for stirring reached 20 kg·cm. The reaction vessel was then pressurized to 1.0 kg/cm$^2$ (0.1 MPa), and the polymer was formed in strands through nozzles each having a circular outlet of 10 mm in diameter and was pelletized with a cutter to the wholly aromatic liquid crystalline polyester (a-16).

This wholly aromatic liquid crystalline polyester (a-16) had Tm of 328° C., the absolute number-average molecular weight of 11200, and the melt viscosity of 30 Pa·s measured at the shear rate of 1000/s and the temperature of 338° C. As the results of composition analysis by the above method, the content of the hydroquinone-derived structural unit to the total amount of the structural units was 8.7 mole percent. The ratio of the structural unit (I) to the sum of the structural unit (I), the structural unit (II) and the structural unit (III) was 73 mole percent. The ratio of the structural unit (II) to the sum of the structural unit (II) and the structural unit (III) was 59 mole percent. The ratio of the structural unit (IV) to the sum of the structural unit (IV) and the structural unit (V) was 77 mole percent. The total amount of the structural unit (II) and the structural unit (III) was substantially equimolar with the total amount of the structural unit (IV) and the structural unit (V).

As the results of measurement of the amounts of terminal groups by the above method, the amount (a) of terminal hydroxyl group was 162 equivalents/(g·10$^{-6}$), the amount (b) of terminal acetyl group was 18 equivalents/(g·10$^{-6}$), the amount (c) of terminal carboxyl group was 133 equivalents/(g·10$^{-6}$), and the ratio [(a)+(b)]/(c) was 1.35.

Preparation Example 17

In a 5 L reaction vessel with stirring blades and a distillation pipe, 870 parts by weight of p-hydroxybenzoic acid, 335 parts by weight of 4,4'-dihydroxybiphenyl, 99 parts by weight of hydroquinone, 292 parts by weight of terephthalic acid, 157 parts by weight of isophthalic acid, 5 parts by weight of hydroquinone as excess addition of hydroquinone and 1324 parts by weight of acetic anhydride (1.10 equivalents of the total amount of phenolic hydroxyl group) were mixed, were reacted with stirring in nitrogen atmosphere at 147° C. for 1 hour and were then heated to 330° C. in 4 hours. The reaction mixture was heated with controlling the reflux amount and the distillation amount of acetic acid produced by the reaction to have the removal rate of 69% at the temperature of 250° C. The reaction further proceeded with keeping the polymerization temperature at 330° C. and reducing the pressure to 1.0 mmHg (133 Pa) in 1.0 hour. The polymerization was terminated when the torque required for stirring reached 20 kg·cm. The reaction vessel was then pressurized to 1.0 kg/cm$^2$ (0.1 MPa), and the polymer was formed in strands through nozzles each having a circular outlet of 10 mm in diameter and was pelletized with a cutter to the wholly aromatic liquid crystalline polyester (a-17).

This wholly aromatic liquid crystalline polyester (a-17) had Tm of 310° C., the absolute number-average molecular weight of 12300, and the melt viscosity of 33 Pa·s measured at the shear rate of 1000/s and the temperature of 320° C. As the results of composition analysis by the above method, the content of the hydroquinone-derived structural unit to the total amount of the structural units was 7.7 mole percent. The ratio of the structural unit (I) to the sum of the structural unit (I), the structural unit (II) and the structural unit (III) was 70 mole percent. The ratio of the structural unit (II) to the sum of the structural unit (II) and the structural unit (III) was 67 mole percent. The ratio of the structural unit (IV) to the sum of the structural unit (IV) and the structural unit (V) was 65 mole percent. The total amount of the structural unit (II) and the structural unit (III) was substantially equimolar with the total amount of the structural unit (IV) and the structural unit (V).

As the results of measurement of the amounts of terminal groups by the above method, the amount (a) of terminal hydroxyl group was 140 equivalents/(g·10$^{-6}$), the amount (b) of terminal acetyl group was 20 equivalents/(g·10$^{-6}$), the amount (c) of terminal carboxyl group was 103 equivalents/(g·10$^{-6}$), and the ratio [(a)+(b)]/(c) was 1.55.

Preparation Example 18

In a 5 L reaction vessel with stirring blades and a distillation pipe, 870 parts by weight of p-hydroxybenzoic acid, 285 parts by weight of 4,4'-dihydroxybiphenyl, 129 parts by weight of hydroquinone, 388 parts by weight of terephthalic acid, 60 parts by weight of isophthalic acid, 5 parts by weight of hydroquinone as excess addition of hydroquinone and 1324 parts by weight of acetic anhydride (1.10 equivalents of the total amount of phenolic hydroxyl group) were mixed, were reacted with stirring in nitrogen atmosphere at 147° C. for 1 hour and were then heated to 360° C. in 4 hours. The reaction mixture was heated with controlling the reflux amount and the distillation amount of acetic acid produced by the reaction to have the removal rate of 70% at the temperature of 250° C. The reaction further proceeded with keeping the polymerization temperature at 360° C. and reducing the pressure to 1.0 mmHg (133 Pa) in 1.0 hour. The polymerization was terminated when the torque required for stirring reached 20 kg·cm. The reaction vessel was then pressurized to 1.0 kg/cm² (0.1 MPa), and the polymer was formed in strands through nozzles each having a circular outlet of 10 mm in diameter and was pelletized with a cutter to the wholly aromatic liquid crystalline polyester (a-18).

This wholly aromatic liquid crystalline polyester (a-18) had Tm of 345° C., the absolute number-average molecular weight of 9800, and the melt viscosity of 28 Pa·s measured at the shear rate of 1000/s and the temperature of 355° C. As the results of composition analysis by the above method, the content of the hydroquinone-derived structural unit to the total amount of the structural units was 10.0 mole percent. The ratio of the structural unit (I) to the sum of the structural unit (I), the structural unit (II) and the structural unit (III) was 70 mole percent. The ratio of the structural unit (II) to the sum of the structural unit (II) and the structural unit (III) was 57 mole percent. The ratio of the structural unit (IV) to the sum of the structural unit (IV) and the structural unit (V) was 87 mole percent. The total amount of the structural unit (II) and the structural unit (III) was substantially equimolar with the total amount of the structural unit (IV) and the structural unit (V).

As the results of measurement of the amounts of terminal groups by the above method, the amount (a) of terminal hydroxyl group was 170 equivalents/(g·10$^{-6}$), the amount (b) of terminal acetyl group was 10 equivalents/(g·10$^{-6}$), the amount (c) of terminal carboxyl group was 110 equivalents/(g·10$^{-6}$), and the ratio [(a)+(b)]/(c) was 1.64.

Table 1 shows the results of composition analysis, measurement of the amounts of terminal groups and measurement of absolute number-average molecular weight with respect to the wholly aromatic liquid crystalline polyesters obtained in the respective Preparation Examples, as well as the removal rates of acetic acid when the polymerization reaction temperature for preparation of the respective wholly aromatic liquid crystalline polyesters reached 250° C.

TABLE 1

| | | Hydroquinone-Derived Structural Unit (mol %) | Total Amount of Terminal Hydroxyl Group and Terminal Acetyl Group [equivalent/(g·10$^{-6}$)] | Total Amount of Terminal Hydroxyl Group and Terminal Acetyl Group/Amount of Terminal Carboxyl Group | Amount of Terminal Hydroxyl Group/Total Amount of Terminal Hydroxyl Group and Terminal Acetyl Group | Absolute Number-Ave. MW | (I)/[(I) + (II) + (III)] (mol %) | (II)/[(II) + (III)] (mol %) | (IV)/[(IV) + (V)] (mol %) | Removal Rate (%) at 250° C. |
|---|---|---|---|---|---|---|---|---|---|---|
| PREP 1 | a-1 | 8.0 | 100 | 1.11 | 0.60 | 9800 | 75 | 60 | 76 | 71 |
| PREP 2 | a-2 | 7.3 | 110 | 1.17 | 0.55 | 10500 | 68 | 70 | 63 | 72 |
| PREP 3 | a-3 | 7.9 | 155 | 1.18 | 0.50 | 7800 | 77 | 58 | 70 | 68 |
| PREP 4 | a-4 | 7.6 | 100 | 1.18 | 0.50 | 10200 | 66 | 70 | 88 | 74 |
| PREP 5 | a-5 | 5.8 | 120 | 1.20 | 0.45 | 8800 | 70 | 75 | 92 | 77 |
| PREP 6 | a-6 | 4.0 | 110 | 1.25 | 0.45 | 9500 | 75 | 80 | 70 | 64 |
| PREP 7 | a-7 | 5.8 | 110 | 1.21 | 0.35 | 8900 | 80 | 65 | 52 | 65 |
| PREP 8 | a-8 | 6.8 | 125 | 1.21 | 0.45 | 8800 | 63 | 75 | 90 | 69 |
| PREP 9 | a-9 | 3.1 | 85 | 1.08 | 0.35 | 9250 | 82 | 80 | 45 | 77 |
| PREP 10 | a-10 | 10.4 | 135 | 1.27 | 0.50 | 6900 | 70 | 55 | 88 | 63 |
| PREP 11 | a-11 | 7.3 | 48 | 0.94 | 0.50 | 14600 | 68 | 70 | 63 | 84 |
| PREP 12 | a-12 | 6.7 | 91 | 0.98 | 0.47 | 9800 | 67 | 73 | 63 | 48 |
| PREP 13 | a-13 | 8.0 | 410 | 1.41 | 0.25 | 4200 | 75 | 60 | 76 | 74 |
| PREP 14 | a-14 | 15.6 | 85 | 1.31 | 0.45 | 8900 | 65 | 40 | 80 | 75 |
| PREP 15 | a-15 | 1.7 | 85 | 1.09 | 0.60 | 9400 | 80 | 90 | 55 | 78 |
| PREP 16 | a-16 | 8.7 | 180 | 1.35 | 0.90 | 11200 | 73 | 59 | 77 | 70 |
| PREP 17 | a-17 | 7.7 | 160 | 1.55 | 0.88 | 12300 | 70 | 67 | 65 | 69 |
| PREP 18 | a-18 | 10.0 | 180 | 1.64 | 0.94 | 9800 | 70 | 57 | 87 | 70 |

Examples 1 to 13, Comparative Examples 1 to 5

The pellets of the wholly aromatic liquid crystalline polyester obtained in each of the Preparation Examples described above were dried at 150° C. for 3 hours with a hot-air dryer.

The hot-air dried liquid crystalline polyesters (a-1) to (a-10) and (a-16) to (a-18) were respectively specified as liquid crystalline polyesters of Examples 1 to 13. The hot-air dried liquid crystalline polyesters (a-11) to (a-15) were respectively specified as liquid crystalline polyesters of Comparative Examples 1 to 5. The liquid crystalline polyesters of Examples 1 to 13 and Comparative Examples 1 to 5 were evaluated for the properties (1) to (5) described below.

The liquid crystalline polyester resin compositions of Examples 14 to 33 and the liquid crystalline polyester resin compositions of Comparative Examples 6 to 15 were produced by adding the fillers to the wholly aromatic liquid crystalline polyesters obtained in the respective Preparation Examples. The following fillers were used in the respective Examples and Comparative Examples Filler (B)

(b-1) glass chopped strand (ECSO3T747H) manufactured by Nippon Electric Glass Co., Ltd.;
(b-2) milled fiber (EPG70M-01N) manufactured by Nippon Electric Glass Co., Ltd.;
(b-3) mica "MICALET" (registered trademark) 41PU5 manufactured by YAMAGUCHI MICA CO., LTD;
(b-4) talc (NK64) manufactured by FUJI TALC INDUSTRIAL CO., LTD.

Examples 14 to 33, Comparative Examples 6 to 15

In a TEM35B twin-screw extruder (intermeshed co-rotation) with cylinders C1 (main feeder-side heater) to C6 (die-side heater) manufactured by TOSHIBA MACHINE CO., LTD., a side feeder was placed in the cylinder C3 and a vacuum vent was placed in the cylinder C5. By using a screw arrangement with kneading blocks built in the cylinders C2 and C4, the wholly aromatic liquid crystalline polyesters (a-1 to a-18) of the respective compositions specified in Tables 3 to 5 were loaded from the hopper, while the fillers (b-1 to b-4), if applicable, of the respective compositions specified in Tables 3 to 5 were further added from the side feeder relative to 100 parts by weight of each of the wholly aromatic liquid crystalline polyesters. The mixture was melt-kneaded at the cylinder temperature set to the melting point of the wholly aromatic liquid crystalline polyester +20° C. The wholly aromatic liquid crystalline polyester resin composition formed in strands from the die was cooled down in a water bath and was pelletized to pellets with a strand cutter. The pellets thus obtained were dried at 150° C. for 3 hours with an air-hot dryer and were then evaluated for the following properties (1) to (5).

(1) Fog Resistance

The wholly aromatic liquid crystalline polyester or the wholly aromatic liquid crystalline polyester resin composition in each of Examples 1 to 33 and Comparative Examples 1 to 15 was pre-dried at 130° C. for 3 hours with a hot-air dryer, and 5 grams of each were weighed in a test tube (18.0 mm in outer diameter×75 mm in height) as a sample. The sample test tube was inserted in a dry block bath (manufactured by SCINICS CORPORATION) including two aluminum blocks of 71 mm in depth with six holes of 18.5 mm$\phi$ in diameter. The opening of the test tube was covered with a slide, and the test tube was heated at 230° C. for 10 hours. The gas evolved during the heating process deposited on the slide. The haze value (haziness) of the slide was then measured with a direct reading haze meter (manufactured by TOYO SEIKI CO., LTD). The smaller haze value shows the less haziness and indicates the better fog resistance, while the larger haze value shows the greater haziness and indicates the poorer fog resistance.

(2) Metal Adhesion Property

The wholly aromatic liquid crystalline polyester or the wholly aromatic liquid crystalline polyester resin composition in each of Examples 1 to 33 and Comparative Examples 1 to 15 was injection molded by an injection molding machine FANUC α30C (manufactured by FANUC Corporation) at the cylinder temperature set to the melting point of the wholly aromatic liquid crystalline polyester +20° C. under the conditions of the die temperature of 90° C., the injection rate of 120 mm/s, the pressure kept at 30 MPa, and the pressure-keeping time of 2 seconds, after insertion of a brass terminal (7 mm×20 mm×2 mm) into a strip specimen die (10 mm×50 mm×3.2 mm). This gave a test piece for measurement of metal terminal pull-out strength, in which a metal terminal 1 was embedded in resin 2 to the depth of 5 mm as shown in FIG. 1. The metal terminal and the resin were fixed by a chuck, and the metal terminal pull-out strength was measured with a tensile strength tester Tensilon UTA-2.5T (manufactured by ORIENTEC CO., LTD) at the strain rate of 2 mm/minute. The higher metal terminal pull-out strength indicates the better metal adhesion property, while the lower metal terminal pull-out strength indicates the poorer metal adhesion property.

(3) Creep Resistance

The wholly aromatic liquid crystalline polyester resin composition in each of Examples 14 to 33 and Comparative Examples 6 to 15 was injection molded to an ASTM No. 1 dumbbell test piece by an injection molding machine SG75H-MIV (Sumitomo Heavy Industries, Ltd.). The ASTM No. 1 dumbbell test piece was subjected to tensile creep test under the conditions of the span of 114 mm, the ambient temperature of 120° C. and the tensile stress of 15 MPa in conformity with ASTM-D2990 for measurement of the tensile creep strain. The tensile creep strain is obtained by dividing the displacement by the span. The tensile creep strain obtained herein was the average value of five measurements after elapse of 150 hours since the start of the test. The smaller tensile creep strain indicates the better creep resistance and means that the molded product is unlikely to be thermally deformed.

(4) Mold Deposit

After addition of 0.05 parts by weight of a mold release agent (LicowaxE, manufactured by Clariant Corporation) to 100 parts by weight of the wholly aromatic liquid crystalline polyester or the wholly aromatic liquid crystalline polyester resin composition in each of Examples 1 to 33 and Comparative Examples 1 to 15, the mixture was continuously molded to rectangular molded products of 50 mm×50 mm×1 mm in thickness to 1000 shots at the maximum until the appearance of mold deposit by the injection molding machine FANUC α30C (manufactured by FANUC Corporation) at the cylinder temperature set to the melting point of the wholly aromatic liquid crystalline polyester +20° C. under the conditions of the die temperature of 90° C. and the molding cycle of 12 seconds. The appearance of mold deposit was checked after every 100 shots, and the number of shots in 100-shot unit when the appearance of deposit in the die cavity was observed, was evaluated as the mold deposit resistance. The more number of shots when the appearance of deposit in the die cavity is observed means the high mold deposit resistance.

(5) Thermal Stability in the Molten State

The wholly aromatic liquid crystalline polyester resin composition in each of Examples 14, 15 and 29 to 33 and Comparative Examples 6, 11 and 12 was kept in the molten state at the temperature of the melting point of the wholly aromatic liquid crystalline polyester +20° C. for 10 minutes and for 60 minutes in a Koka-type flow tester CFT-500D (orifice of 0.5φ×10 mm) (manufactured by Shimadzu Corporation). The melt viscosity of the resin composition was then measured at the shear rate of 1000/s, and the difference (melt viscosity in the molten state kept for 60 minutes)−(melt viscosity in the molten state kept for 10 minutes) was calculated as the change in melt viscosity. The less change in melt viscosity between the different time periods when the resin composition is kept in the molten state indicates the better thermal stability in the molten state.

The results of the evaluation of Examples 1 to 33 and Comparative Examples 1 to 15 are shown in Tables 2 to 5.

TABLE 2

| | Wholly Aromatic Liquid Crystalline Polyester | | | | | Metal | |
| --- | --- | --- | --- | --- | --- | --- | --- |
| | Wholly Aromatic Liquid Crystalline Polyester (parts by weight) | Hydroquinone-Derived Structural Unit (mol %) | Total Amount of Terminal Hydroxyl Group and Terminal Acetyl Group [equivalent/(g · $10^{-6}$)] | Total Amount of Terminal Hydroxyl Group and Terminal Acetyl Group/ Amount of Terminal Carboxyl Group | Fog Resistance (haze %) | Adhesion Property (Metal Terminal Pull-Out Strength kN) | Mold Deposit (Number of Shots) |
| EX 1 | a-1 (100) | 8.0 | 100 | 1.11 | 9 | 6.11 | >1000 |
| EX 2 | a-2 (100) | 7.3 | 110 | 1.17 | 10 | 5.98 | >1000 |
| EX 3 | a-3 (100) | 7.9 | 155 | 1.18 | 11 | 5.47 | 900 |
| EX 4 | a-4 (100) | 7.6 | 100 | 1.18 | 11 | 5.38 | 800 |
| EX 5 | a-5 (100) | 5.8 | 120 | 1.20 | 13 | 5.05 | 700 |
| EX 6 | a-6 (100) | 4.0 | 110 | 1.25 | 15 | 4.95 | 700 |
| EX 7 | a-7 (100) | 5.8 | 110 | 1.21 | 16 | 4.60 | 500 |
| EX 8 | a-8 (100) | 6.8 | 125 | 1.21 | 14 | 4.08 | 600 |
| EX 9 | a-9 (100) | 3.1 | 85 | 1.08 | 18 | 4.20 | 400 |
| EX 10 | a-10 (100) | 10.4 | 135 | 1.27 | 15 | 3.97 | 500 |
| EX 11 | a-16 (100) | 8.7 | 180 | 1.35 | 8 | 6.23 | >1000 |
| EX 12 | a-17 (100) | 7.7 | 160 | 1.55 | 7 | 6.45 | >1000 |
| EX 13 | a-18 (100) | 10.0 | 180 | 1.64 | 8 | 6.00 | 900 |
| Comp. EX 1 | a-11 (100) | 7.3 | 48 | 0.94 | 32 | 1.98 | <100 |
| Comp. EX 2 | a-12 (100) | 6.7 | 91 | 0.98 | 30 | 2.23 | <100 |
| Comp. EX 3 | a-13 (100) | 8.0 | 410 | 1.41 | 48 | 2.11 | <100 |
| Comp. EX 4 | a-14 (100) | 15.6 | 85 | 1.31 | 28 | 2.54 | <100 |
| Comp. EX 5 | a-15 (100) | 1.7 | 85 | 1.09 | 35 | 2.86 | <100 |

TABLE 3

| | Wholly Aromatic Liquid Crystalline Polyester (parts by weight) | Filler (parts by weight) | Wholly Aromatic Liquid Crystalline Polyester | | | | | | |
| --- | --- | --- | --- | --- | --- | --- | --- | --- | --- |
| | | | Hydroquinone-Derived Structural Unit (mol %) | Total Amount of Terminal Hydroxyl Group and Terminal Acetyl Group [equivalent/(g · $10^{-6}$)] | Total Amount of Terminal Hydroxyl Group and Terminal Acetyl Group/ Amount of Terminal Carboxyl Group | Fog Resistance (haze %) | Metal Adhesion Property (Metal Terminal Pull-Out Strength kN) | Creep Resistance (%) | Mold Deposit (Number of Shots) |
| EX 14 | a-1 (100) | b-1 (55) | 8.0 | 100 | 1.11 | 8 | 6.66 | 1.2 | >1000 |
| EX 15 | a-2 (100) | b-1 (55) | 7.3 | 110 | 1.17 | 9 | 6.37 | 1.3 | >1000 |
| EX 16 | a-3 (100) | b-1 (55) | 7.9 | 155 | 1.18 | 10 | 5.88 | 1.5 | >1000 |
| EX 17 | a-4 (100) | b-1 (55) | 7.6 | 100 | 1.18 | 10 | 5.68 | 1.7 | 900 |
| EX 18 | a-5 (100) | b-1 (55) | 5.8 | 120 | 1.20 | 12 | 5.29 | 1.6 | 700 |
| EX 19 | a-6 (100) | b-1 (55) | 4.0 | 110 | 1.25 | 14 | 5.29 | 1.6 | 800 |
| EX 20 | a-7 (100) | b-1 (55) | 5.8 | 110 | 1.21 | 15 | 4.80 | 1.9 | 600 |
| EX 21 | a-8 (100) | b-1 (55) | 6.8 | 125 | 1.21 | 13 | 4.21 | 2.0 | 700 |
| EX 22 | a-9 (100) | b-1 (55) | 3.1 | 85 | 1.08 | 17 | 4.41 | 2.1 | 500 |
| EX 23 | a-10 (100) | b-1 (55) | 10.4 | 135 | 1.27 | 14 | 4.12 | 1.8 | 500 |
| EX 24 | a-2 (100) | b-2 (55) | 7.3 | 110 | 1.17 | 9 | 6.17 | 1.4 | >1000 |
| EX 25 | a-2 (100) | b-1 (35) b-3 (20) | 7.3 | 110 | 1.17 | 8 | 5.78 | 1.5 | >1000 |
| EX 26 | a-2 (100) | b-2 (35) b-4 (20) | 7.3 | 110 | 1.17 | 9 | 5.68 | 1.4 | >1000 |
| EX 27 | a-2 (100) | b-3 (66) | 7.3 | 110 | 1.17 | 7 | 5.68 | 2.5 | >1000 |
| EX 28 | a-2 (100) | b-4 (66) | 7.3 | 110 | 1.17 | 8 | 5.78 | 2.6 | >1000 |

TABLE 4

Wholly Aromatic Liquid Crystalline Polyester

| | Wholly Aromatic Liquid Crystalline Polyester (parts by weight) | Filler (parts by weight) | Hydroquinone-Derived Structural Unit (mol %) | Total Amount of Terminal Hydroxyl Group and Terminal Acetyl Group [equivalent/(g · $10^{-6}$)] | Total Amount of Terminal Hydroxyl Group and Terminal Acetyl Group/ Amount of Terminal Carboxyl Group | Fog Resistance (haze %) | Metal Adhesion Property (Metal Terminal Pull-Out Strength kN) | Creep Resistance (%) | Mold Deposit (Number of Shots) |
|---|---|---|---|---|---|---|---|---|---|
| Comp. EX 6  | a-11 (100) | b-1 (55) | 7.3  | 48  | 0.94 | 24 | 2.65 | 2.9 | <100 |
| Comp. EX 7  | a-12 (100) | b-1 (55) | 6.7  | 91  | 0.98 | 23 | 2.94 | 3.0 | <100 |
| Comp. EX 8  | a-13 (100) | b-1 (55) | 8.0  | 410 | 1.41 | 42 | 2.45 | 4.2 | <100 |
| Comp. EX 9  | a-14 (100) | b-1 (55) | 15.6 | 85  | 1.31 | 21 | 2.94 | 2.8 | 100  |
| Comp. EX 10 | a-15 (100) | b-1 (55) | 1.7  | 85  | 1.09 | 30 | 3.23 | 3.2 | <100 |
| Comp. EX 11 | a-11 (100) | b-2 (55) | 7.3  | 48  | 0.94 | 22 | 2.65 | 3.0 | <100 |
| Comp. EX 12 | a-11 (100) | b-1 (35) b-3 (20) | 7.3 | 48 | 0.94 | 23 | 2.55 | 3.3 | <100 |
| Comp. EX 13 | a-11 (100) | b-2 (35) b-4 (20) | 7.3 | 48 | 0.94 | 24 | 2.74 | 3.2 | <100 |
| Comp. EX 14 | a-11 (100) | b-3 (66) | 7.3  | 48  | 0.94 | 21 | 2.55 | 4.8 | <100 |
| Comp. EX 15 | a-11 (100) | b-4 (66) | 7.3  | 48  | 0.94 | 21 | 2.65 | 4.9 | <100 |

TABLE 5

Wholly Aromatic Liquid Crystalline Polyester

| | Wholly Aromatic Liquid Crystalline Polyester (parts by weight) | Filler (parts by weight) | Hydroquinone-Derived Structural Unit (mol %) | Total Amount of Terminal Hydroxyl Group and Terminal Acetyl Group [equivalent/(g · $10^{-6}$)] | Total Amount of Terminal Hydroxyl Group and Terminal Acetyl Group/ Amount of Terminal Carboxyl Group | Fog Resistance (haze %) | Metal Adhesion Property (Metal Terminal Pull-Out Strength kN) | Creep Resistance (%) | Mold Deposit (Number of Shots) | Thermal Stability in the Molten State (Pa · s) |
|---|---|---|---|---|---|---|---|---|---|---|
| EX 29 | a-16 (100) | b-1 (55) | 8.7  | 180 | 1.35 | 8  | 6.75 | 1.1 | >1000 | 1.4 |
| EX 30 | a-17 (100) | b-1 (55) | 7.7  | 160 | 1.55 | 7  | 6.60 | 1.2 | >1000 | 2.0 |
| EX 31 | a-18 (100) | b-1 (55) | 10.0 | 180 | 1.64 | 9  | 6.20 | 1.5 | 900   | 2.7 |
| EX 32 | a-16 (100) | b-2 (55) | 8.7  | 180 | 1.35 | 8  | 6.20 | 1.4 | >1000 | 1.1 |
| EX 33 | a-16 (100) | b-1 (35) b-3 (20) | 8.7 | 180 | 1.35 | 9 | 5.82 | 1.6 | >1000 | 1.3 |
| EX 14 | a-1 (100)  | b-1 (55) | 8.0  | 100 | 1.11 | 8  | 6.66 | 1.2 | >1000 | 3.8 |
| EX 15 | a-2 (100)  | b-1 (55) | 7.3  | 110 | 1.17 | 9  | 6.37 | 1.3 | >1000 | 4.8 |
| Comp. EX 6  | a-11 (100) | b-1 (55) | 7.3 | 48 | 0.94 | 24 | 2.65 | 2.9 | <100 | 21.5 |
| Comp. EX 11 | a-11 (100) | b-2 (55) | 7.3 | 48 | 0.94 | 22 | 2.65 | 3.0 | <100 | 18.4 |
| Comp. EX 12 | a-11 (100) | b-1 (35) b-3 (20) | 7.3 | 48 | 0.94 | 23 | 2.55 | 3.3 | <100 | 17.5 |

As clearly shown in Table 2, the wholly aromatic liquid crystalline polyesters in our Examples have excellent fog resistance and metal adhesion property. As clearly shown in Tables 3 and 4, the wholly aromatic liquid crystalline polyester resin compositions in our Examples have excellent fog resistance and metal adhesion property, high creep resistance and less mold deposit during injection molding, and are suitable for mass production.

As clearly shown in Tables 2 and 5, the wholly aromatic liquid crystalline polyesters and the wholly aromatic liquid crystalline polyester resin compositions with the ratio [(a)+(b)]/(c) of 1.30 to 2.00 has excellent fog resistance, metal adhesion property and creep resistance and remarkable thermal stability in the molten state.

INDUSTRIAL APPLICABILITY

The wholly aromatic liquid crystalline polyester and the resin composition and the molded product obtained from the same have excellent fog resistance, metal adhesion property and creep resistance and are especially useful in fields of electricity and electronics.

The invention claimed is:

1. A wholly aromatic liquid crystalline polyester comprising 2.0 to 15.0 mole percent of a hydroquinone-derived structural unit relative to a total amount of structural units,
    the wholly aromatic liquid crystalline polyester having a sum of an amount (a) of terminal hydroxyl group and an amount (b) of terminal acetyl group of 50 to 350 equivalents/(g·$10^{-6}$), and having a ratio [(a)+(b)]/(c) of the sum of the amount (a) of terminal hydroxyl group and the amount (b) of terminal acetyl group to an amount (c) of terminal carboxyl group of 1.05 to 2.00.

2. The wholly aromatic liquid crystalline polyester according to claim 1, wherein the wholly aromatic liquid crystalline polyester has a ratio (a)/[(a)+(b)] of the amount (a) of terminal hydroxyl group to the sum of the amount (a) of terminal hydroxyl group and the amount (b) of terminal acetyl group of 0.30 to 1.00.

3. The wholly aromatic liquid crystalline polyester according to claim 1, wherein the wholly aromatic liquid crystalline polyester has an absolute number-average molecular weight of 5000 to 25000 measured by gel permeation chromatography/light scattering method.

4. The wholly aromatic liquid crystalline polyester according to claim 2, wherein the wholly aromatic liquid crystalline polyester has an absolute number-average molecular weight of 5000 to 25000 measured by gel permeation chromatography/light scattering method.

5. The wholly aromatic liquid crystalline polyester according to claim 1, wherein
the wholly aromatic liquid crystalline polyester comprises structural units (I), (II), (III), (IV) and (V) shown below,
content of the structural unit (I) is 65 to 80 mole percent relative to a total amount the structural units (I), (II) and (III),
content of the structural unit (II) is 55 to 85 mole percent relative to a total amount of the structural units (II) and (III),
content of the structural unit (IV) is 50 to 95 mole percent relative to a total amount of the structural units (IV) and (V), and
the total amount of the structural units (II) and (III) is substantially equimolar with the total amount of the structural units (IV) and (V)

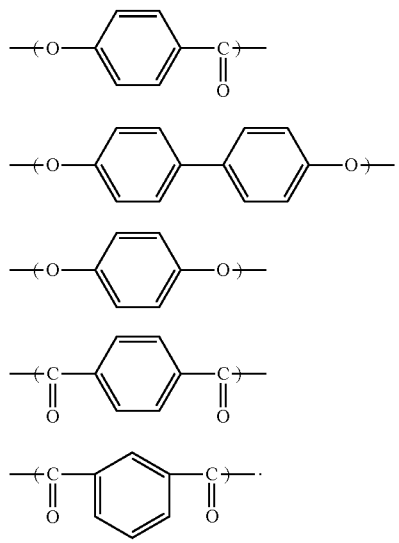

6. The wholly aromatic liquid crystalline polyester according to claim 2, wherein
the wholly aromatic liquid crystalline polyester comprises structural units (I), (II), (III), (IV) and (V) shown below, wherein
content of the structural unit (I) is 65 to 80 mole percent relative to a total amount the structural units (I), (II) and (III),
content of the structural unit (II) is 55 to 85 mole percent relative to a total amount of the structural units (II) and (III),
content of the structural unit (IV) is 50 to 95 mole percent relative to a total amount of the structural units (IV) and (V), and
the total amount of the structural units (II) and (III) is substantially equimolar with the total amount of the structural units (IV) and (V)

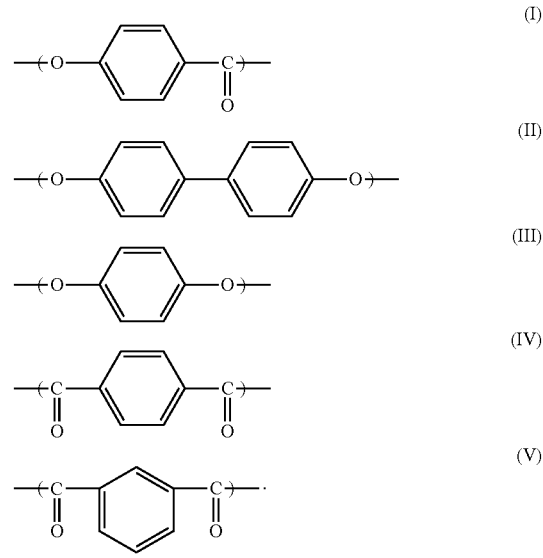

7. A method of producing the wholly aromatic liquid crystalline polyester according to claim 1, comprising:
acetylating a hydroxyl group of a material monomer of the wholly aromatic liquid crystalline polyester with acetic anhydride and subsequently heating a polymerization reaction solution to or above a melting temperature of the wholly aromatic liquid crystalline polyester with removal of acetic acid to enable deacetylation polymerization, thereby producing the wholly aromatic liquid crystalline polyester, wherein
a removal rate obtained by Equation [1] given below is 50 to 80% when a temperature of the polymerization reaction solution reaches about 250° C.:

removal rate(%)=amount of distillate (g)/[(number of moles of loaded acetic anhydride (mol)−number of moles of hydroxyl group (mol) in the material monomer)×molecular weight of acetic anhydride (g/mol)+(number of moles of hydroxyl group (mol) in the material monomer×2×molecular weight of acetic acid (g/mol))]×100     [1].

8. The method according to claim 2, wherein a removal rate obtained by Equation [1] given is 50 to 80% when the temperature of the polymerization reaction solution reaches about 250° C.

9. A wholly aromatic liquid crystalline polyester resin composition produced by adding 10 to 200 parts by weight of filler relative to 100 parts by weight of the wholly aromatic liquid crystalline polyester according to claim 1.

10. A molded product manufactured by melt molding the wholly aromatic liquid crystalline polyester according to claim 1.

11. A molded product manufactured by melt molding the wholly aromatic liquid crystalline polyester resin composition according to claim 9.

* * * * *